United States Patent
Shin et al.

(10) Patent No.: US 11,304,180 B2
(45) Date of Patent: Apr. 12, 2022

(54) METHOD AND DEVICE OF RESOURCE ALLOCATION FOR SIDELINK TRANSMISSION IN WIRELESS COMMUNICATION SYSTEM

(71) Applicant: Samsung Electronics Co., Ltd., Gyeonggi-do (KR)

(72) Inventors: Cheolkyu Shin, Gyeonggi-do (KR); Jinyoung Oh, Gyeonggi-do (KR); Hyunseok Ryu, Gyeonggi-do (KR); Sungjin Park, Gyeonggi-do (KR); Jonghyun Bang, Gyeonggi-do (KR); Jeongho Yeo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 52 days.

(21) Appl. No.: 16/834,496

(22) Filed: Mar. 30, 2020

(65) Prior Publication Data

US 2020/0314804 A1    Oct. 1, 2020

(30) Foreign Application Priority Data

Mar. 28, 2019  (KR) .................. 10-2019-0036288
May 10, 2019   (KR) .................. 10-2019-0055106

(51) Int. Cl.
*H04W 72/04*      (2009.01)
*H04W 72/02*      (2009.01)
(Continued)

(52) U.S. Cl.
CPC .......... *H04W 72/02* (2013.01); *H04L 1/1819* (2013.01); *H04W 24/10* (2013.01);
(Continued)

(58) Field of Classification Search
CPC . H04W 72/02; H04W 24/10; H04W 28/0268; H04W 76/27; H04W 76/14;
(Continued)

(56) References Cited

U.S. PATENT DOCUMENTS

2019/0246249 A1\*  8/2019  Lee .................. H04W 4/40
2020/0295883 A1\*  9/2020  Lee .................. H04L 5/0057
(Continued)

OTHER PUBLICATIONS

Intel, Summary of Contributions and Initial Outcome of Offline Discussion for NR-V2X AI—7.2.4.1.4 Resource Allocation Mechanism, Jan. 21-25, 2019, R1-1901375, 3GPP TSG RAN WG1 Ad Hoc Meeting #1901 (Year: 2019).\*
(Continued)

*Primary Examiner* — Hassan Kizou
*Assistant Examiner* — Mahbubul Bar Chowdhury
(74) *Attorney, Agent, or Firm* — The Farrell Law Firm, P.C.

(57) ABSTRACT

Methods and apparatuses are provided in which sidelink control information (SCI) including information on a resource occupied by a receiving terminal, is received at a transmitting terminal, from the receiving terminal. A retransmission scheme of the transmitting terminal is identified. Based on the identified transmission scheme, a threshold is determined for transmission resource selection for a resource identified based on the information on the resource. The transmission resource selection is performed according to a sidelink measurement for the identified resource. The sidelink measurement is performed based on the determined threshold.

10 Claims, 14 Drawing Sheets

(51) Int. Cl.
*H04W 24/10* (2009.01)
*H04W 28/02* (2009.01)
*H04W 76/27* (2018.01)
*H04L 1/18* (2006.01)
*H04W 92/18* (2009.01)

(52) U.S. Cl.
CPC ....... *H04W 28/0268* (2013.01); *H04W 76/27* (2018.02); *H04W 92/18* (2013.01)

(58) Field of Classification Search
CPC ........ H04W 92/18; H04L 1/1819; H04L 1/20; H04L 1/1887; H04L 1/1893; H04L 27/2602; H04L 5/0023; H04L 5/0071; H04L 5/0055; H04L 5/0048; H04L 5/0032; H04L 5/0064
See application file for complete search history.

(56) References Cited

U.S. PATENT DOCUMENTS

| | | | |
|---|---|---|---|
| 2020/0359375 A1* | 11/2020 | Hwang | H04W 72/0406 |
| 2021/0045088 A1* | 2/2021 | Cai | H04W 72/0446 |
| 2021/0084656 A1* | 3/2021 | Feng | H04W 74/0816 |
| 2021/0153062 A1* | 5/2021 | Zhang | H04W 40/246 |
| 2021/0160817 A1* | 5/2021 | Khoryaev | H04B 17/318 |
| 2021/0212117 A1* | 7/2021 | Chae | H04W 72/04 |

OTHER PUBLICATIONS

Intel, Outcome of Offline Discussion #2 for NR-V2X AI—7.2.4.1.4 Resource Allocation Mechanism, Jan. 21-25, 2019, R1-1901462, 3GPP TSG RAN WG1 Ad Hoc Meeting #1901 (Year: 2019).*
Huawei, Sidelink resource allocation mode 2, Jan. 21-25, 2019, R1-1900026, 3GPP TSG RAN WG1 Ad-Hoc Meeting 1901 (Year: 2019).*

* cited by examiner (a) The resource pool always consists of contiguous PRBs (b) The resource pool can consist of non-contiguous PRBs

METHOD AND DEVICE OF RESOURCE ALLOCATION FOR SIDELINK TRANSMISSION IN WIRELESS COMMUNICATION SYSTEM

CROSS-REFERENCE TO RELATED APPLICATION(S)

This application is based on and claims priority under 35 U.S.C. 119(a) to Korean Patent Application Nos. 10-2019-0036288 and 10-2019-0055106, filed on Mar. 28, 2019 and May 10, 2019, respectively, in the Korean Intellectual Property Office, the disclosures of which are incorporated herein by reference in their entireties.

BACKGROUND

1. Field

The disclosure relates generally to a mobile communication system and a wireless communication system and, more particularly, to a method and a device for resource allocation in a process in which a vehicular terminal or user equipment (UE) supporting vehicle-to-everything (V2X) communication exchanges information with another vehicular terminal and a pedestrian portable terminal by using a sidelink (SL).

2. Description of Related Art

The 5G or pre-5G communication system is also referred to as a "beyond 4G network" or a "post long term evolution (LTE) system". The 5G communication system defined by 3GPP is referred to as a new radio (NR) system.

The 5G communication system is implemented in higher frequency (mmWave) bands, e.g., 60 GHz bands, so as to achieve higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques have been applied to 5G communication systems.

Additionally, in 5G communication systems, the development of system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like.

In the 5G system, hybrid frequency shift keying (FSK) and quadrature amplitude modulation (FQAM) and sliding window superposition coding (SWSC) have been developed as advanced coding modulations (ACMs), and filter bank multi carrier (FBMC), non-orthogonal multiple access (NOMA), and sparse code multiple access (SCMA) have been developed as advanced access technologies.

The Internet is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Various attempts have been made to apply 5G communication systems to IoT networks. For example, technologies such as a sensor network, MTC, and M2M communication may be implemented by beamforming, MIMO, and array antennas. The application of a cloud RAN as a big data processing technology may also be considered an example of the convergence of 5G and IoT technologies.

SUMMARY

An aspect of the disclosure provides various terminal autonomous resource allocation methods in a sidelink communication, and thus, enables various types of traffic supports and operations of quality of service (QoS) in a sidelink.

According to an embodiment, a method performed by a transmitting terminal is provided. Sidelink control information (SCI) including information on a resource occupied by a receiving terminal, is received from the receiving terminal. A retransmission scheme of the transmitting terminal is identified. Based on the identified transmission scheme, a threshold is determined for transmission resource selection for a resource identified based on the information on the resource. The transmission resource selection is performed according to a sidelink measurement for the identified resource. The sidelink measurement is performed based on the determined threshold.

According to an embodiment, a method performed by a receiving terminal is provided. SCI including information on a resource occupied by the receiving terminal is transmitted to a transmitting terminal. A threshold for transmission resource selection for a resource identified based on the information on the resource is determined based on an identification of a retransmission scheme of the transmitting terminal. The transmission resource selection is performed according to a sidelink measurement for the identified resource. The sidelink measurement is performed based on the determined threshold.

According to an embodiment, a transmitting terminal is provided that includes a transceiver configured to transmit and receive signals, and a controller. The controller is configured to receive, from a receiving terminal, SCI including information on a resource occupied by the receiving terminal, and identify a retransmission scheme of the transmitting terminal. The controller is also configured to determine, based on the identified transmission scheme, a threshold for transmission resource selection for a resource identified based on the information on the resource, and perform the transmission resource selection according to a sidelink measurement for the identified resource. The sidelink measurement is performed based on the determined threshold.

According to an embodiment, a receiving terminal is provided that includes a transceiver configured to transmit and receive signals, and a controller. The controller is configured to transmit, to a transmitting terminal, SCI including information on a resource occupied by the receiving terminal. A threshold of transmission resource selection for a resource identified based on the information on the resource is determined based on an identification of a retransmission scheme of the transmitting terminal. The transmission resource selection is performed according to a sidelink measurement for the identified resource. The sidelink measurement is performed based on the threshold.

BRIEF DESCRIPTION OF THE DRAWINGS

The above and other aspects, features, and advantages of the disclosure will be more apparent from the following detailed description when taken in conjunction with the accompanying drawings, in which.

DETAILED DESCRIPTION

Figure 1:
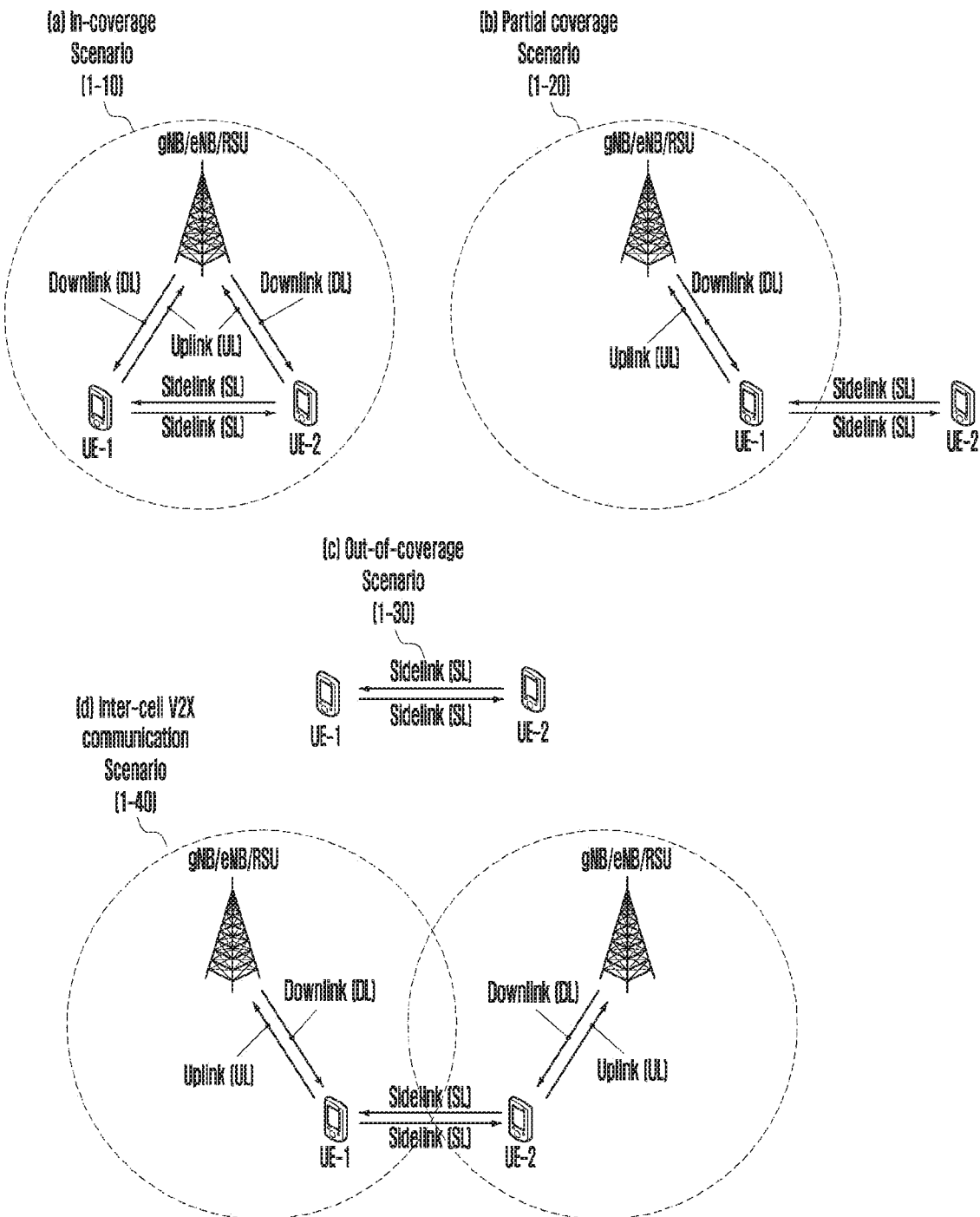
FIG. 1 is a diagram illustrating a system describing an embodiment.

Hereinafter, embodiments of the disclosure are described in detail with reference to the accompanying drawings. The same or similar components may be designated by the same or similar reference numerals although they are illustrated in different drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure.

In the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various forms. The following embodiments are provided only to completely disclose the disclosure and inform those skilled in the art of the scope of the disclosure, and the disclosure is defined only by the scope of the appended claims.

Each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Embodiments of the disclosure will be described in detail from the perspective of a wireless access network new RAN (NR) and a packet core (a 5G system, a 5G core network, or a next generation core (NG core)) which is a core network according to the 5G mobile communication standard specified by the 3GPP which is a mobile communication standardization organization. However, the subject matter of the disclosure can be slightly modified within a scope not departing from the scope of the disclosure and can be applied to other communication systems having similar technical backgrounds, which are executed based on the decision made by those skilled in the art to which the disclosure belongs.

In a 5G system, a network data collection and analysis function (NWDAF), which is a network function which provides a function of analyzing and providing data collected in a 5G network, may be defined to support network automation. The NWDAF may collect/store/analyze information from the 5G network and provide a result of the collection/storage/analysis to an unspecified network function (NF), and the result of the analysis may be used independently in each NF.

Some terms and names defined in 3rd generation partnership project long term evolution (3GPP LTE) standards (or standards for 5G, NR, LTE, or similar systems) are used for the convenience of description. However, the disclosure is not limited by these terms and names, and may be applied in the same way to systems that conform other standards.

Further, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

Efforts of developing an improved 5G communication system (NR) have been made to meet the increasing demand for wireless data traffic after the commercialization of a 4G communication system. Unlike the LTE system, the 5G communication system supports various subcarrier spacings (SCSs) such as 15 kHz, 30 kHz, 60 kHz, and 120 kHz. A physical control channel uses a polar coding and a physical data channel uses a low density parity check (LDPC). In addition, cyclic prefix ODFM (CP-OFDM) is used as well as discrete Fourier transform spread orthogonal frequency division multiplexing (DFT-S-OFDM) as a waveform for uplink transmission. The LTE system may support a hybrid automatic repeat request (HARQ) retransmission in the unit of a TB, while the 5G system may additionally support HARQ retransmission based on a code block group (CBG) in which multiple code blocks (CBs) are bundled.

A plurality of services may be provided to a user in the 5G communication system, and in order to provide the plurality of services to a user, a method capable of providing each service within the same time interval according to characteristics and a device using the same are required. Various services provided in the 5G communication system have been studied, and one of the services is a service which satisfies low latency and high reliability requirements.

In the case of a vehicular communication, LTE-based V2X communication has been standardized in 3GPP Rel-14 and Rel-15, based on a D2D communication structure.

Efforts are being made to develop 5G NR-based V2X communication. In NR V2X communication, a broadcast communication, a groupcast (or a multicast) communication, and a unicast communication between a terminal and a terminal will be supported. In addition, unlike the LTE V2X communication, which aims to transmit and receive basic safety information required for road driving of a vehicle, the NR V2X communication aims to provide more advanced services such as, for example, platooning, advanced driving, extended sensors, and remote driving.

A method for allocating a transmission resource to a terminal (UE) in a sidelink communication may be divided into two allocation modes including scheduled resource allocation (mode 1) and UE autonomous resource allocation (mode 2). In the case of the scheduled resource allocation (mode 1), a base station uses a dedicated scheduling scheme to allocate resources used for sidelink transmission to UEs. In contrast, in the case of the UE autonomous resource allocation (mode 2), a UE selects a transmission resource according to a predetermined rule. Unlike mode 1 in which a base station directly allocates a resource for the sidelink communication through scheduling, in the case of mode 2, a UE performs resource allocation for a transmission resource, and thus, an algorithm for the resource allocation is required to be defined.

In UE autonomous resource allocation in an existing LTE system-based sidelink, an algorithm is defined for a transmission packet having a characteristic of periodic traffic. For example, a packet corresponding to basic safety information (BSI) may be transmitted with the characteristic of periodic traffic. However, in an NR system-based sidelink, during UE autonomous resource allocation, packet transmission of aperiodic traffic as well as periodic traffic is considered. As such, in a situation where periodic and aperiodic traffic coexist, the existing UE autonomous resource allocation method supported in the LTE sidelink has a limit on performance.

Therefore, a UE autonomous resource allocation (mode 2) method herein considers an environment in which various types of traffic are supported. In addition, in the existing LTE-based UE autonomous resource allocation algorithm, priority information of a packet is used for resource allocation. In this case, the priority information for a specific packet is mainly determined by latency requirements. However, an NR-based UE autonomous resource allocation algorithm may use priority information for various quality of services (QoSs) which satisfy not only latency requirements but also reliability, a minimum required communication range for transmitted traffic, and data rate requirements.

As described above, unlike the existing LTE sidelink, in an NR sidelink, a UE autonomous resource allocation method in a situation where periodic and aperiodic traffic coexist is required to be considered. However, there is no discussion on the UE autonomous resource allocation method. Therefore, the disclosure provides a UE autonomous resource allocation algorithm for the UE autonomous resource allocation method. In addition, the disclosure provides a UE autonomous resource allocation method considering various QoS requirements considered in the NR sidelink. Further, the disclosure provides a signaling configuration and a UE operation method and device.

The disclosure relates to a wireless communication system and, particularly, to a method and a device for resource allocation in a process in which a vehicular terminal supporting V2X communication exchanges information with another vehicular terminal and a pedestrian portable terminal by using a sidelink. Specifically, the resource allocation method may be divided into two allocation modes including scheduled resource allocation (mode 1) and UE autonomous resource allocation (mode 2) according to a method for allocating a resource to a UE by a base station for V2X sidelink communication. In the case of the scheduled resource allocation (mode 1), a base station uses a dedicated scheduling scheme to allocate resources used for sidelink transmission to UEs. In contrast, in the case of the UE autonomous resource allocation (mode 2), a UE selects a transmission resource according to a predetermined rule. The disclosure provides a UE autonomous resource allocation (mode 2) method for supporting various types of traffic and satisfying QoS. Further, the disclosure relates to an operation of a base station and a UE and a configuration for such a UE autonomous resource allocation.

In an embodiment described below, a related method and device are provided in an NR sidelink system.

FIG. 1 is a diagram illustrating a system for describing an embodiment.

An in-coverage scenario 1-10 of FIG. 1 illustrates a case where all V2X UEs, UE-1 and UE-2, are located within a coverage area of a base station.

The V2X UEs may receive data and control information from the base station through a downlink (DL) or may transmit data and control information to the base station through an uplink (UL). The data and control information may be data and control information for V2X communication. Alternatively, the data and control information may be data and control information for a general cellular communication. In addition, the V2X UEs may transmit or receive data and control information for V2X communication through a sidelink (SL).

A partial coverage scenario 1-20 of FIG. 1 illustrates a case where, among the V2X UEs, UE-1 is located within a coverage area of a base station and UE-2 is located out of the coverage area of the base station.

The UE-1 located within the coverage of the base station may receive data and control information from the base station through a DL or may transmit data and control information to the base station through an UL.

The UE-2 located out of the coverage of the base station cannot receive data and control information from the base station through the downlink, and cannot transmit data and control information to the base station through the uplink.

The UE-2 may transmit or receive data and control information for V2X communication through a sidelink to or from the UE-1.

An out-of-coverage scenario 1-30 of FIG. 1 illustrates a case where all V2X UEs are located out of a coverage area of a base station.

UE-1 and UE-2 cannot receive data and control information from the base station through a downlink, and cannot transmit data and control information to the base station through an uplink.

The UE-1 and the UE-2 may transmit or receive data and control information for V2X communication through a sidelink.

An inter-cell V2X communication scenario 1-40 of FIG. 1 illustrates a scenario of performing V2X communication between UEs located in different cells. Specifically, a V2X transmitting UE and a V2X receiving UE are connected to different base stations (a radio resource control (RRC) connected state) or have camped on (an RRC disconnected state, that is, an RRC idle state). The UE-1 may be the V2X transmitting UE and the UE-2 may be the V2X receiving UE. Alternatively, the UE-1 may be the V2X receiving UE and the UE-2 may be the V2X transmitting UE. The UE-1 may receive a V2X dedicated system information block (SIB) from a base station to which the UE-1 is connected (or is camping on a specific cell), and the UE-2 may receive the V2X dedicated SIB from another base station to which the UE-2 is connected (or is camping on a specific cell). Information of the V2X dedicated SIB received by the UE-1 and information of the V2X dedicated SIB received by the UE-2 may be different from each other. Accordingly, in order to perform V2X communication between UEs located in different cells, information may be unified, or more flexible parameter configurations may be supported through a related-parameter configuration method and device of the disclosure.

FIG. 1 illustrates a V2X system including two UEs, UE-1 and UE-2, for convenience of description, but is not limited thereto. In addition, an uplink and a downlink between a base station and V2X UEs may be referred to as a Uu interface, and a sidelink between the V2X UEs may be referred to as a PC5 interface. Therefore, in the disclosure, the terms can be interchangeably used.

A UE may refer to a vehicle supporting a vehicle-to-vehicle (V2V) communication, a vehicle supporting a vehicle-to-pedestrian (V2P) communication, a pedestrian's handset (that is, a smart phone), a vehicle supporting a vehicle-to-network (V2N) communication, or a vehicle supporting a vehicle-to-infrastructure (V2I) communication. In addition, the UE may refer to a road side unit (RSU) having a UE function, an RSU having a base station function, or an RSU having a part of the base station function and a part of the UE function.

It is predefined that a base station may be a base station supporting both V2X communication and a general cellular communication, or a base station supporting only V2X communication. In addition, the base station may refer to a 5G base station (gNB), a 4G base station (eNB), or a RSU. Therefore, unless otherwise noted in the disclosure, the base station and the RSU can be interchangeably used.

Figure 2:
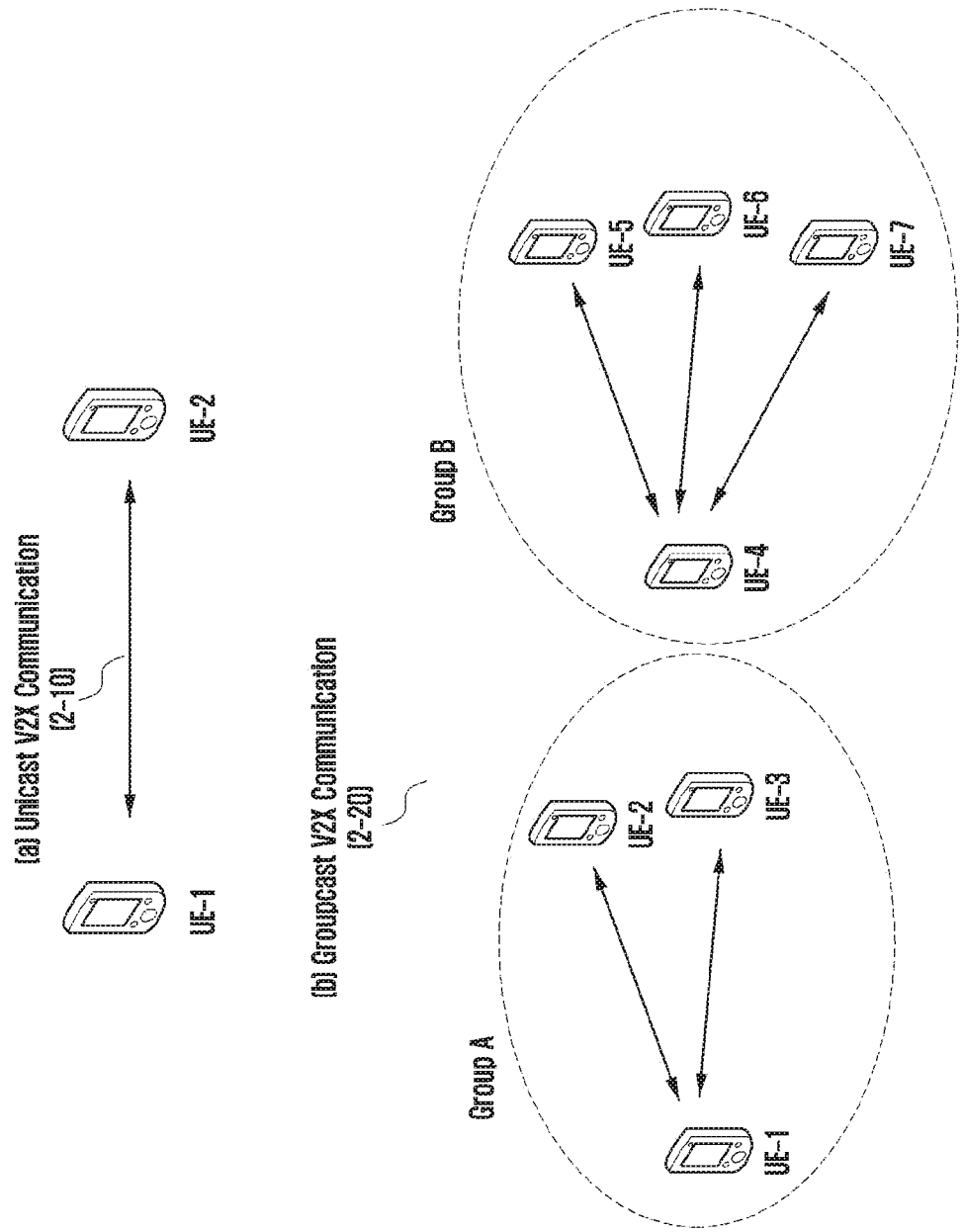
FIG. 2 is a diagram illustrating a V2X communication method performed through a sidelink, according to an embodiment.

FIG. 2 is a diagram illustrating an example of a V2X communication method performed through a sidelink, according to an embodiment.

In unicast V2X communication 2-10 of FIG. 2, a TX UE and a RX UE may perform one-to-one communication, which may be referred to as a unicast communication.

In groupcast V2X communication 2-20 of FIG. 2, the TX UE and the RX UE may perform one-to-many communication, which may be referred to as groupcast or multicast.

In 2-20 of FIG. 2, UE-1, UE-2, and UE-3 form one group (group A) to perform a groupcast communication and UE-4, UE-5, UE-6, and UE-7 form another group (group B) to perform the groupcast communication. Each UE performs the groupcast communication only within a group to which each UE itself belongs, and does not perform a communication between different groups. 2-20 of FIG. 2 illustrates the forming of two groups, but the disclosure is not limited to such a situation.

V2X UEs may perform a broadcast communication. The broadcast communication refers to a case where all V2X UEs receive data and control information transmitted by a V2X transmitting UE through a sidelink. For example, in 2-20 of FIG. 2, when it is assumed that the UE-1 is a transmitting UE for broadcast, all UEs UE-2, UE-3, UE-4, UE-5, UE-6, and UE-7 may receive data and control information transmitted by the UE-1.

In NR V2X communication, unlike the LTE V2X communication, the support of a form in which a vehicular UE transmits data only to one specific node through unicast and a form in which the vehicular UE transmits data to multiple specific nodes through groupcast may be considered. For example, the unicast and groupcast technologies may be usefully used in consideration of a service scenario such as platooning, which is a technology in which two or more vehicles are connected through one network, and are grouped and move in a cluster. Specifically, a unicast communication may be required for controlling one specific node by a leader node of a group connected through platooning, and a groupcast communication may be required for simultaneously controlling a group of a plurality of specific nodes.

Figure 3:
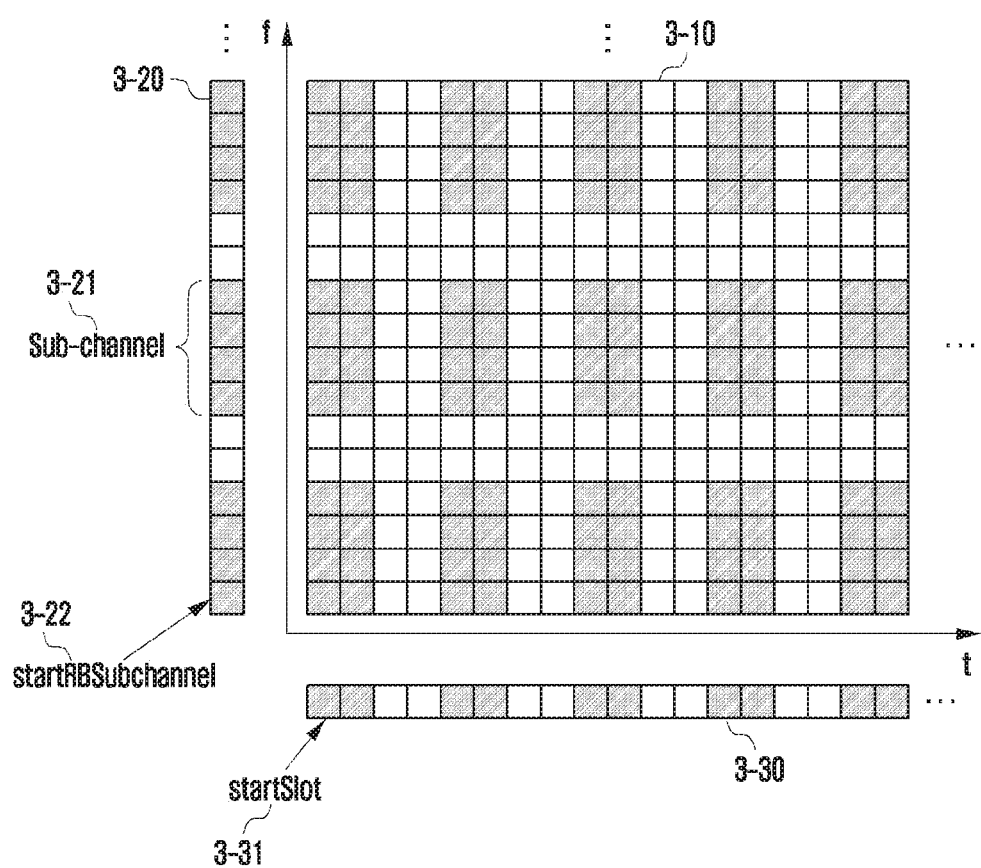
FIG. 3 is a diagram illustrating a resource pool defined as a set of resource elements in a time domain and a frequency domain used for transmission and reception of a sidelink, according to an embodiment.

FIG. 3 is a diagram illustrating a resource pool defined as a set of resource elements in a time domain and a frequency domain used for transmission and reception of a sidelink, according to an embodiment.

Reference numeral 3-10 in FIG. 3 illustrates a case where resource pools are non-continuously allocated in the time domain and frequency domains. Although the disclosure focuses on a case where resource pools are non-continuously allocated in the frequency domain, it is noted that the resource pools may be continuously allocated in the frequency domain.

Reference numeral 3-20 in FIG. 3 illustrates a case where non-continuous resource allocation is performed in the frequency domain. A granularity of resource allocation in the frequency domain may be a physical resource block (PRB).

Reference numeral 3-21 in FIG. 3 illustrates a case where resource allocation in the frequency domain is performed based on a sub-channel. The sub-channel may be defined as a granularity in the frequency domain configured by a plurality of RBs. Specifically, the sub-channel may be defined as an integer multiple of an RB. Reference numeral 3-21 illustrates a case where the size of the sub-channel is configured by four consecutive PRBs. The size of the sub-channel may be differently configured, and it is common for one sub-channel to be configured by consecutive PRBs, but there is no limitation that one sub-channel is necessarily configured by consecutive PRBs. The sub-channel may be a basic granularity of resource allocation for a physical sidelink shared channel (PSSCH) or a physical sidelink control channel (PSCCH), and accordingly, the size of the sub-channel may be differently configured depending on whether a corresponding channel is the PSSCH or PSCCH. In addition, it is noted that the term of the sub-channel can be replaced with other terms such as a resource block group (RBG).

Reference numeral 3-22 in FIG. 3 illustrates a startRB-Subchanel, that is, a start position of a sub-channel in the frequency domain in a resource pool.

Reference numeral 3-30 in FIG. 3 illustrates a case where non-continuous resource allocation is performed in the time domain. A granularity of resource allocation in the time domain may be a slot. Although the disclosure focuses on a case where resource pools are non-continuously allocated in the time domain, it is noted that the resource pools may be continuously allocated in the time domain.

Reference numeral 3-31 in FIG. 3 illustrates a startSlot, that is, a start position of a slot in the time domain in a resource pool.

Figure 4:
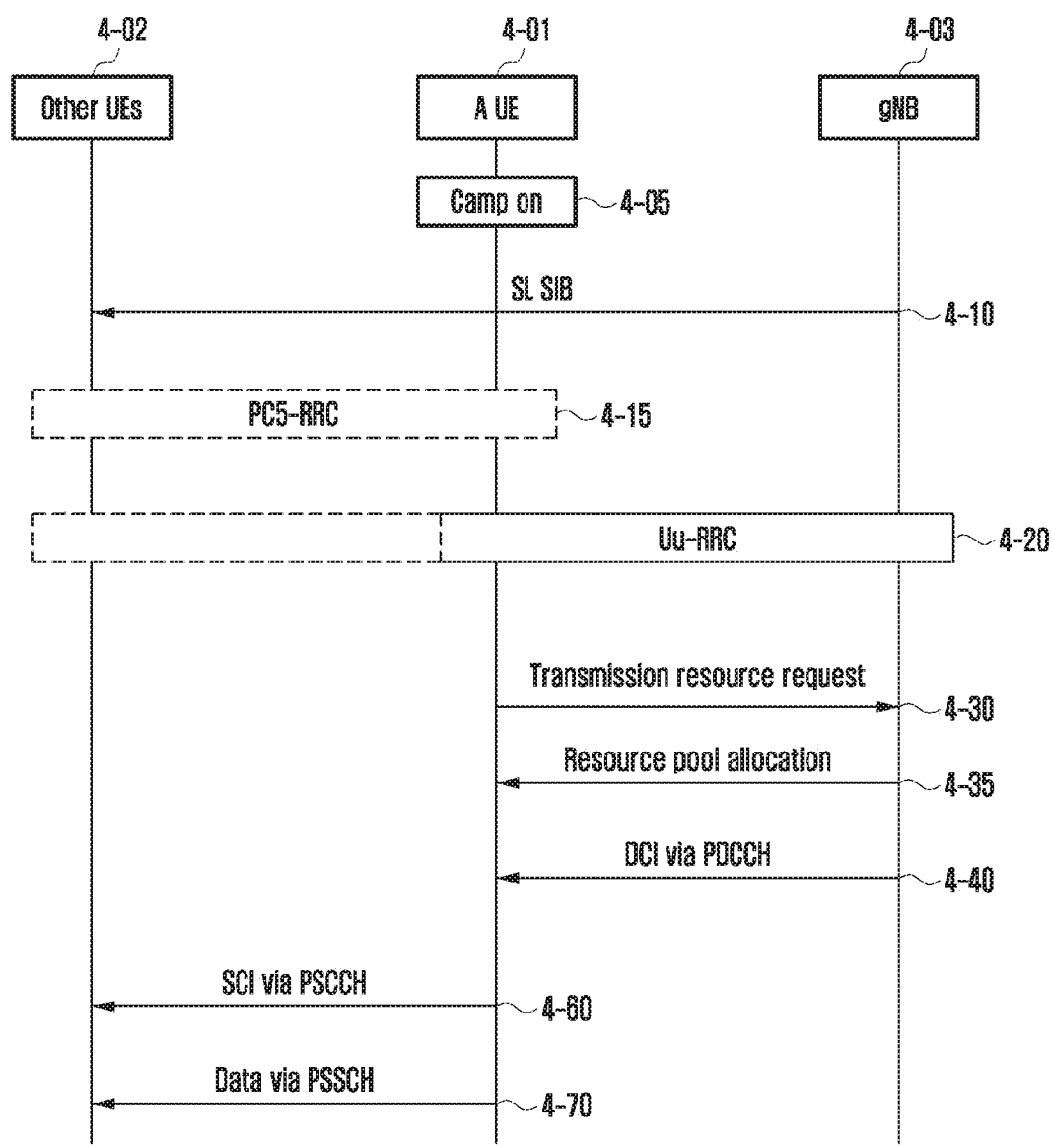
FIG. 4 is a diagram illustrating a scheduled resource allocation (mode 1) method in a sidelink, according to an embodiment.

FIG. 4 is a diagram illustrating a scheduled resource allocation (mode 1) method in a sidelink, according to an embodiment. The scheduled resource allocation (mode 1) corresponds to a method for allocating a resource used for sidelink transmission to RRC-connected UEs 4-02 by a base station 4-03 in a dedicated scheduling manner. The method is effective for interference management and resource pool management since the base station 4-03 can manage a resource of a sidelink.

In FIG. 4, a UE 4-01 camping on a specific cell, in operation 4-05, receives a sidelink system information block (SL SIB) from the base station 4-03, in operation 4-10. The SL SIB may include resource pool information for V2X transmission and reception, configuration information for a sensing operation, information for configuring synchronization, information for inter-frequency transmission and reception, and the like.

When data traffic for V2X is generated, the UE 4-01 performs an RRC connection with the base station 4-03, in operation 4-20. The RRC connection between the UE 4-01 and the base station 4-03 may be referred to as Uu-RRC connection. A process of the Uu-RRC connection may be performed before data traffic generation. The UE 4-01 requests transmission resources for V2X communication with other UEs 4-02 from the base station 4-03, in operation 4-30. The UE 4-01 may make a request to the base station by using an RRC message or medium access control (MAC) control element (CE). SidelinkUEInformation and UEAssistanceInformation messages may be used as the RRC message. The MAC CE may be, for example, a buffer status report MAC CE in a new format (a format at least including an indicator that notifies a buffer status report for V2X communication and information on the size of data that is buffered for D2D communication). The detailed format and content of the buffer status report used in the 3GPP are given with reference to 3GPP standard TS36.321 "E-UTRA MAC Protocol Specification".

The base station 4-03 allocates a V2X transmission resource to the UE 4-01 through a dedicated Uu-RRC message. The message may be included in an RRCConnectionReconfiguration message. The resource allocation may be a V2X resource through Uu or a resource for PC5 according to the type of traffic requested by the UE or whether a corresponding link is congested. For the determination, the UE 4-01 may add and transmit proximity service (ProSe) per packet priority (PPPP) or logical channel ID (LCID) information of V2X traffic through the UEAssistanceInformation message or MAC CE. Since the base station 4-03 also knows information on a resource used by other UEs 4-02, the base station 4-03 allocates, to the UE 4-01, the remaining resource pool among resources requested by the UE 4-01, in operation 4-35. The base station 4-03 instructs the UE 4-01 to perform final scheduling by downlink control information (DCI) transmission via a physical downlink control channel (PDCCH), in operation 4-40.

In the case of broadcast transmission, the UE 4-01 broadcasts SCI, without additional sidelink RRC configuration, in operation 4-15, to other UEs 4-02 via a PSCCH, in operation 4-60. In addition, the UE 4-01 broadcasts data to other UEs 4-02 via a PSSCH, in operation 4-70.

Alternatively, in the case of unicast and groupcast transmission, the UE 4-01 may perform a one-to-one RRC connection with other UEs 4-02. In this case, the RRC connection between a UE and a UE may be referred to as PC5-RRC connection to be distinguished from the Uu-RRC connection. Even in the case of groupcast, the PC5-RRC connection (operation 4-15) is individually established between a UE and a UE which belong to a group. In FIG. 4, the PC5-RRC connection (operation 4-15) is shown as an operation after operation 4-10, but the PC5-RRC connection (operation 4-15) can be performed at any time before operation 4-10 or operation 4-60. If the RRC connection is required between a UE and a UE, the UE 4-01 performs the PC5-RRC connection of the sidelink (operation 4-15) and transmits SCI to other UEs 4-02 via the PSCCH by unicast and groupcast communications (operation 4-60). The groupcast transmission of the SCI may be interpreted as group SCI. In addition, the UE 4-01 transmits data to other UEs 4-02 via the PSSCH by the unicast and groupcast communications (operation 4-70).

Figure 5:
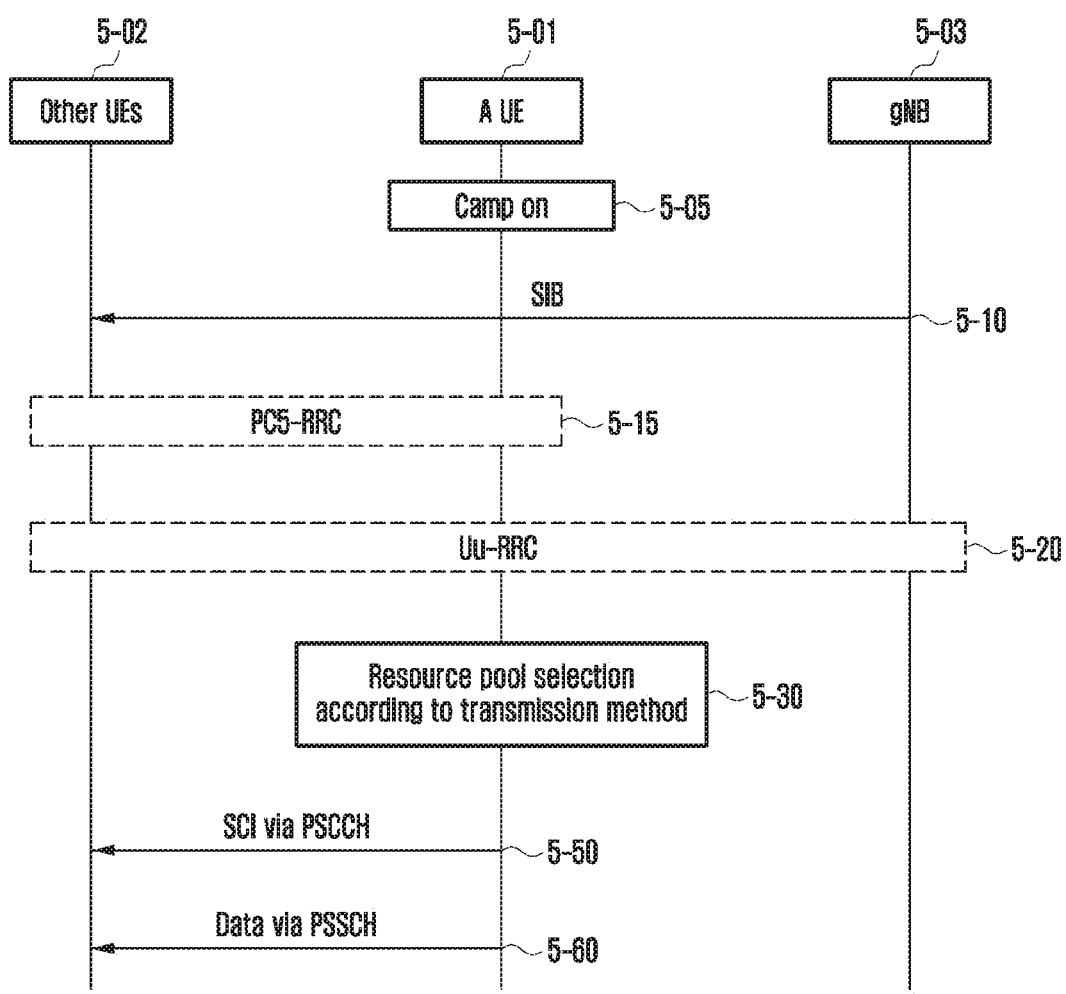
FIG. 5 is a diagram illustrating a UE autonomous resource allocation (mode 2) method in a sidelink, according to an embodiment.

FIG. 5 is a diagram illustrating a UE autonomous resource allocation (mode 2) method in a sidelink, according to an embodiment.

The UE autonomous resource allocation (mode 2) is a scheme in which a base station 5-03 provides a sidelink transmission/reception resource pool for V2X as system information, and a UE selects a transmission resource according to a predetermined rule. A resource selection method may include, for example, zone mapping, sensing-based resource selection, random selection, and the like. Unlike the scheduled resource allocation (mode 1) method in which a base station is directly involved in resource allocation, FIG. 5 illustrates a difference in that a UE 5-01 autonomously selects a resource, based on a resource pool previously received through system information, and transmits data. In V2X communication, the base station 5-03 may allocate various types of resource pools (a V2V resource pool and a V2P resource pool) for the UE 5-01. The resource pool may be configured by a resource pool in which a UE can autonomously select an available resource pool after sensing resources used by other peripheral UEs, and a resource pool in which a UE randomly selects a resource from a preconfigured resource pool.

The UE 5-01 camping on a specific cell, in operation 5-05, receives a SL SIB from the base station 5-03, in operation 5-10. The SL SIB may include resource pool information for transmission and reception, configuration information for a sensing operation, information for configuring synchronization, information for inter-frequency transmission and reception, and the like. The major difference in operations between FIG. 4 and FIG. 5 is that in FIG. 4, the base station 4-03 and the UE 4-01 operate in an RRC connected state, while in FIG. 5, the UE 5-01 can operate with the base station 5-03 even in an idle mode in which an RRC is not connected, in operation 5-20. In addition, even in a state where the RRC is connected, in operation 5-20, the base station 5-03 may operate to allow the UE 5-01 to autonomously select a transmission resource, without directly participating in resource allocation. In this case, the RRC connection between the UE 5-01 and the base station 5-03 may be referred to as Uu-RRC connection (operation 5-20). When data traffic for V2X is generated in the UE 5-01, the UE 5-01 selects a resource pool in a time/frequency domain, according to a configured transmission operation, from among resource pools received through the system information from the base station 5-03, in operation 5-30.

In the case of broadcast transmission, the UE 5-01 broadcasts SCI to other UEs 5-02 via a PSCCH by broadcast without additional sidelink RRC configuration 5-15, in operation 5-50. In addition, the UE 5-01 broadcasts data to other UEs 5-02 via a PSSCH, in operation 5-60.

Alternatively, in the case of unicast and groupcast transmission, the UE 5-01 may perform a one-to-one RRC connection with other UEs. In this case, the RRC connection between a UE and a UE may be referred to as PC5-RRC connection, in operation 5-15, which is distinguished from the Uu-RRC connection. Even in the case of groupcast, the PC5-RRC connection (operation 5-15) is individually established between a UE and a UE which belong to a group. In FIG. 5, the PC5-RRC connection (operation 5-15) is shown as an operation after operation 5-10, but can be performed at any time before operation 5-10 or operation 5-50. If the RRC connection is required between a UE and a UE, the UE 5-01 performs the PC5-RRC connection of the sidelink, in operation 5-15, and transmits SCI to other UEs 5-02 via the PSCCH by unicast and groupcast communications, in operation 5-50. In this case, the groupcast transmission of the SCI may be interpreted as group SCI. In addition, the UE 5-01 transmits data to other UEs 5-02 via the PSSCH by the unicast and groupcast communications, in operation 5-60.

As described above with reference to FIG. 5, for the UE autonomous resource allocation (mode 2) of the sidelink, the disclosure provides a method for performing sensing in a situation where periodic and aperiodic traffic coexist, and selecting a transmission resource. The sensing may be defined as an operation of performing SCI decoding for another UE and an operation of performing sidelink measurement. In addition, the transmission resource selection may be defined as an operation of determining a resource for sidelink transmission by using a result of the sensing. According to a state of the sidelink, a process of reselecting a transmission resource may be performed.

Hereinafter, in order to effectively perform sensing in a situation where periodic and aperiodic traffic coexist, sensing window A and sensing window B are defined.

Figure 6A:
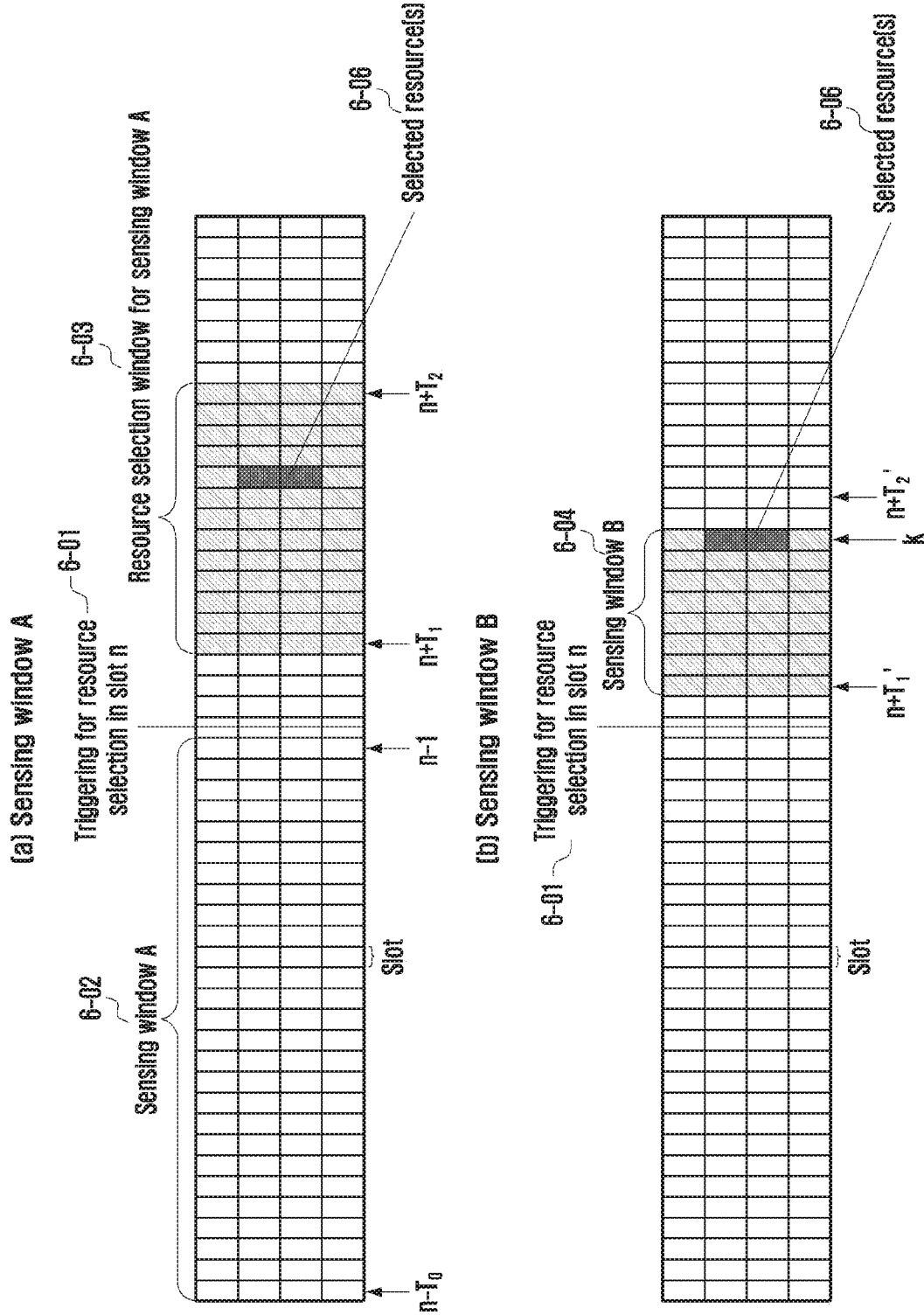
FIGS. 6A and 6B are diagrams illustrating a method for configuring sensing window A and sensing window B for UE autonomous resource allocation (mode 2) of a sidelink, according to an embodiment.
Figure 6B:
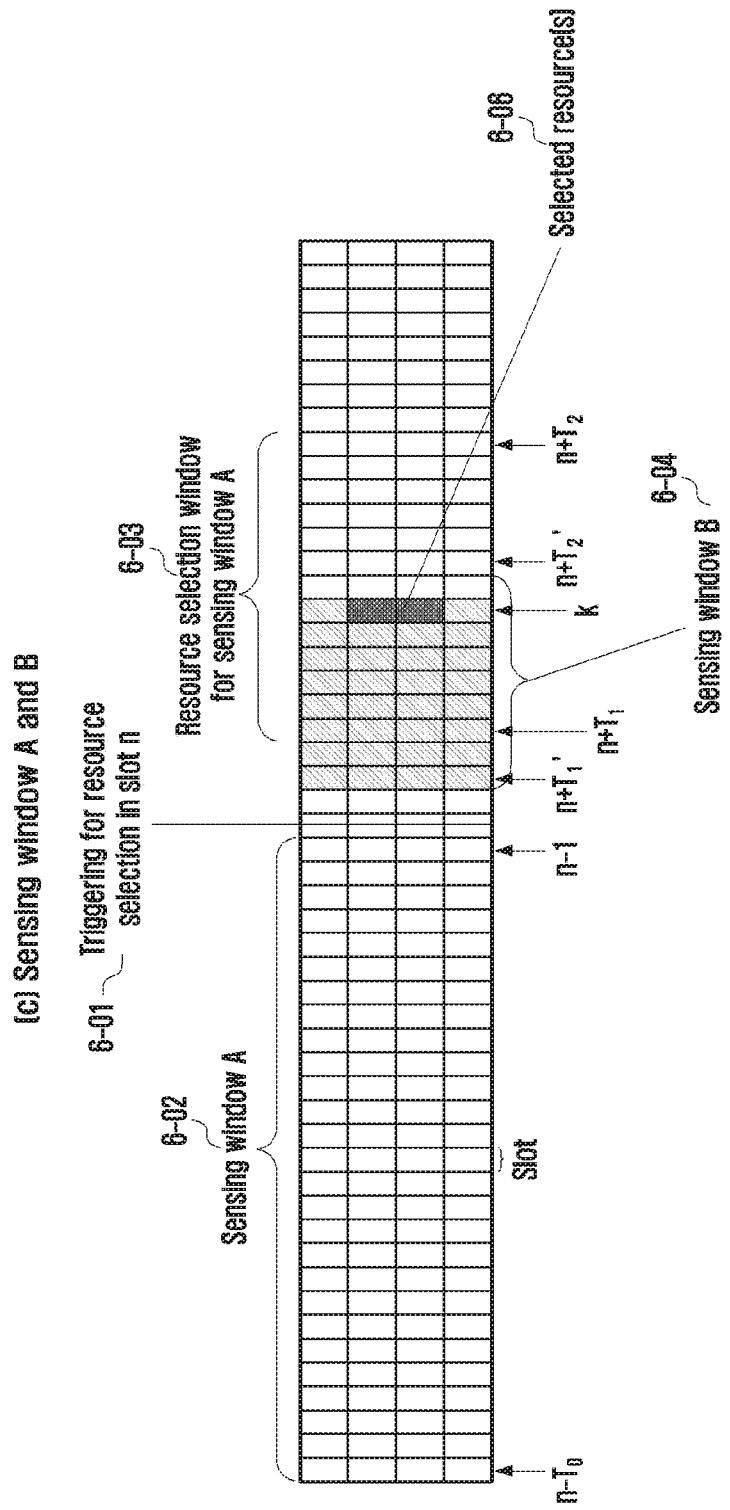

FIG. 6A and FIG. 6B are diagrams illustrating a method for configuring sensing window A and sensing window B for UE autonomous resource allocation (mode 2) of a sidelink, according to an embodiment.

As noted from case (a) in FIG. 6A, when triggering for transmission resource selection occurs in slot n (operation 6-01), sensing window A 6-02 may be defined as follows.

The sensing window A may be defined as a slot interval of $[n-T_0, n-1]$. Here, $T_0$ may be determined as a fixed value or may be determined to be configurable.

As an example of a case where $T_0$ is determined as a fixed value, an expression of $T_0=1000*2^\mu$ may be applied to periodic traffic. Whereas, a fixed value of $T_0=100*2^\mu$ may be configured for aperiodic traffic. The fixed $T_0$ value of the above example may be changed to a different value according to considered traffic characteristics, and may be fixed to the same value for periodic and aperiodic traffic. Here, $\mu$ is an index corresponding to numerology and is configured to the following value according to subcarrier spacing (SCS).

SCS=15 kHz, $\mu=0$
SCS=30 kHz, $\mu=1$
SCS=60 kHz, $\mu=2$
SCS=120 kHz, $\mu=3$

In relation to the case where $T_0$ is determined to be configurable, a configuration for the case may be indicated through SL SIB or UE-specific higher signaling. When the configuration is indicated through the SL SIB, a corresponding value may be configured in resource pool information among the corresponding system information. When $T_0$ is configured in the resource pool information, it means that constant $T_0$ is always used in a resource pool.

In the sensing window A, SCI decoding and sidelink measurement for another UE may be performed.

Resource allocation information for another UE and QoS information for a packet may be obtained from SCI received within the sensing window A. In this case, the resource allocation information may include a reservation interval for a resource. In addition, the QoS information may include priority information according to latency, reliability, a minimum required communication range for transmitted traffic, and data rate requirements. In addition, location information for another UE may be obtained from the received SCI. A TX-RX distance may be calculated from location information of another UE and location information of the subject UE itself.

A sidelink reference signal received power (SL RSRP) may be measured from SCI received within the sensing window A.

A sidelink received signal strength indicator (SL RSSI) may be measured within the sensing window A.

The sensing window A may be mainly used for determining a resource for UE autonomous resource allocation (mode 2) through sensing for periodic traffic. If it is determined that it is not effective to identify periodic resource allocation information of another UE through SCI decoding and allocate a transmission resource to a resource to be used by the another UE by using a sidelink measurement result such as an SL RSRP or SL RSSI, the corresponding resource may be excluded from a resource selection window 6-03. As noted from case (a) in FIG. 6A, when triggering for transmission resource selection occurs in slot n (operation 6-01), the resource selection window 6-03 may be defined as follows.

The resource selection window 6-03 may be defined as a slot interval of $[n+T_1, n+T_2]$. Here, $T_1$ and $T_2$ may be determined as a fixed value or may be determined to be configurable. Alternatively, $T_1$ and $T_2$ are determined in a fixed range, and a UE may configure an appropriate value within the fixed range in consideration of implementation.

As an example in which $T_1$ and $T_2$ are determined in a fixed range and a UE configures an appropriate value within the fixed range in consideration of implementation, the value may be configured by UE for implementation in ranges of $T_1 \leq 4$ and $20 \leq T_2 \leq 100$.

A final transmission resource 6-06 may be selected within the resource selection window 6-03 by using a result of the sensing performed in the sensing window A. A detailed description thereof is given below with reference to the second embodiment.

If sensing is performed using only the sensing window A and transmission resource selection is performed through the sensing as in case (a) in FIG. 6A, the following transmission resource selection method may be used.

Transmission resource selection method-1

Step-1: In the resource selection window 6-03, the number of allocatable resource candidates $M_{total}$ is determined based on resource pool information. A detailed description thereof is given below with reference to the first embodiment.

Step-2: A UE leaves X ($\leq M_{total}$) number of allocatable resource candidates, exclusive of a resource determined to be ineffective for use due to occupation of another UE in the resource selection window 6-03 by using a result of sensing in the sensing window A 6-02. A detailed description of a method for excluding a resource through sidelink measurement and SCI decoding for another UE is given below with reference to the second embodiment.

Step-3: Resource candidate list X is reported to a UE higher layer, and the final transmission resource is randomly selected from among X number of candidates in the UE higher layer (operation 6-06).

As noted from case (b) in FIG. 6A, when triggering for transmission resource selection occurs in slot n (operation 6-01), sensing window B 6-04 may be defined as follows.

The sensing window B may be defined as a slot interval of $[n+T_1', n+T_2']$. Here, $T_1'$ and $T_2'$ may be determined as a fixed value or may be determined to be configurable. Alternatively, $T_1'$ and $T_2'$ are determined in a fixed range, and a UE may configure an appropriate value within the fixed range in consideration of implementation. In addition, when k indicates a slot in which a resource is lastly selected, the sensing window B 6-04 is stopped in slot k, and the sensing window B 6-04 in this case is $[n+T_1', k]$.

$T_1'$ and $T_2'$ may be configured to be the same as the values of $T_1$ and $T_2$ of the resource selection window 6-03, respectively, or may be configured to be different from the values.

For example, a configuration wherein $T_1'=0$ means that sensing is performed from triggering slot n for transmission resource selection.

The sensing window B 6-04 may be configured as one slot or at least one slot by the configured values of $T_1'$ and $T_2'$.

In the sensing window B 6-04, SCI decoding and sidelink measurement for
another UE may be performed.

A detailed description of the sensing operation in the sensing window B 6-04 is given below with reference to the second and third embodiments.

The sensing window B 6-04 may be mainly used for determining a resource for UE autonomous resource allocation (mode 2) through sensing of periodic and aperiodic traffic in addition to the sensing window A 6-03. It is possible to sense, in the sensing window B 6-04 later configured based on the triggering slot n for transmission resource selection, aperiodic traffic which cannot be predicted in the sensing window A 6-03, by using sidelink measurement for a slot to which an actual transmission resource can be allocated. Performing sensing through the sensing window B 6-04 may be understood as an operation of performing sensing on traffic sensed in each slot regardless of whether the traffic is periodic or aperiodic. As noted from case (b) in FIG. 6A, if sensing is performed using the sensing window B 6-04 and transmission resource selection is performed through the sensing, the following transmission resource selection method may be used.

Transmission resource selection method-2

Step-1: Sensing is performed in a corresponding slot within the sensing window B 6-04 to determine whether a corresponding resource is idle.

A resource allocation granularity in the frequency domain may be defined to include A ($\geq 1$) number of sub-channels or all sub-channels. The number of allocatable resource candidates $N_{total}$ within a corresponding slot is determined according to the resource allocation granularity in the frequency domain. A detailed description thereof is given below with reference to the first embodiment.

Sensing may be performed through SCI decoding and sidelink measurement.

A detailed description thereof is given below with reference to the second and third embodiments.

Step-2-1: If the corresponding resource is determined to be idle through the sensing in step-1, a final transmission resource 6-06 is determined from among the number of allocatable resource candidates $N_{total}$ within the corresponding slot.

Additional details are given below with reference to the first and third embodiments.

Step-2-2: If the corresponding resource is determined to be busy through the sensing in step-1, the following operation may be selected.

> If the next slot is also configured as the sensing window B 6-04, step-1 is performed by moving on to the next slot.
>
> If the next slot is not configured as the sensing window B 6-04, the following operation may be considered.
>
>> The final transmission resource 6-06 is determined by using QoS information or an energy detection result in the current slot. The QoS information may include priority information according to latency, reliability, a minimum required communication range for transmitted traffic, and data rate requirements.
>>
>> The transmission in the current slot may be canceled and a backoff operation may be performed.
>>
>> Additional details are given below with reference to the third embodiment.

As defined in cases (a) and (b) of FIG. 6A, the sensing window A 6-02 and the sensing window B 6-04 may be divided with reference to a time point when triggering for transmission resource selection descends. Specifically, based on triggering slot n for transmission resource selection, a previously configured sensing interval may be defined as the sensing window A 6-02 and a subsequently configured sensing interval may be defined as the sensing window B 6-04.

Case (c) of FIG. 6B corresponds to an example of a case where both sensing window A 6-02 and sensing window B 6-04 are configured. The sensing window A 6-02 and the sensing window B 6-04 when triggering for transmission resource selection occurs in slot n (operation 6-01) are discussed with reference to the above definition. As noted from case (c) in FIG. 6B, if sensing is performed using both the sensing window A 6-02 and the sensing window B 6-04 and transmission resource selection is performed through the sensing, the following transmission resource selection method may be used.

Transmission resource selection method-3

> Step-1: In the resource selection window 6-03, the number of allocatable resource candidates $M_{total}$ is determined based on resource pool information. A detailed description thereof is given below with reference to the first embodiment.
>
> Step-2: X ($\leq M_{total}$) number of allocatable resource candidates are left, exclusive of a resource determined to be ineffective for use due to occupation of another UE in the resource selection window 6-03 by using a result of sensing in the sensing window A 6-02. A detailed description of a method for excluding a resource through sidelink measurement and SCI decoding for another UE is given below with reference to the second embodiment.
>
> Step-3: Resource candidate list X is reported to a UE higher layer, and Y number of candidates are randomly down-selected from among X number of candidates in the higher layer.
>
> Step-4-1: When the sensing window B 6-04 is included in the resource selection window 6-03, a UE selects, among the Y number of candidates determined in the higher layer, the final transmission resource 6-06 by the transmission resource selection method-2 by using a result of sensing of the sensing window B 6-04 in a physical layer.
>
>> The case where the sensing window B 6-04 is included in the resource selection window 6-03 corresponds to an interval of $[n+T_1, k]$ in graph (c) of FIG. 6B. Such a condition may be determined by configuration of $T_1$ and $T_2$ and $T_1'$ and $T_2'$.
>
> Step-4-2: When the sensing window B is not included in the resource selection window 6-03, the final transmission resource 6-06 is selected by the transmission resource selection method-2 by using the result of sensing in the sensing window B in the physical layer.
>
>> The case where the sensing window B 6-04 is not included in the resource selection window 6-03 corresponds to an interval of $[n+T_1', n+T_1-1]$ in graph (c) of FIG. 6B. Such a condition may be determined by configuration of $T_1$ and $T_2$ and $T_1'$ and $T_2'$.

In the transmission resource selection method-3, the operation (step-3) of selecting the Y number of candidates in the higher layer may be omitted and the following method may be used.

Transmission resource selection method-4

> Step-1: In the resource selection window 6-03, the number of allocatable resource candidates $M_{total}$ is determined based on resource pool information. A detailed description thereof is given below with reference to the first embodiment.
>
> Step-2: X ($\leq M_{total}$) number of allocatable resource candidates are left, exclusive of a resource determined to be ineffective for use due to occupation of another UE in the resource selection window 6-03 by using a result of sensing in the sensing window A 6-02. A detailed description of a method for excluding a resource through sidelink measurement and SCI decoding for another UE is given below with reference to the second embodiment.
>
> Step-3-1: When the sensing window B 6-04 is included in the resource selection window 6-03, a UE selects, among X number of candidates, the final transmission resource 6-06 by the transmission resource selection method-2 by using a result of sensing of the sensing window B 6-04 in a physical layer.
>
>> The case where the sensing window B 6-04 is included in the resource selection window 6-03 corresponds to an interval of $[n+T_1, k]$ in graph (c) of FIG. 6B. Such a condition may be determined by configuration of $T_1$ and $T_2$ and $T_1'$ and $T_2'$.
>
> Step-3-2: When the sensing window B 6-04 is not included in the resource selection window 6-03, the final transmission resource 6-06 is selected by the transmission resource selection method-2 by using the result of sensing in the sensing window B 6-04 in the physical layer.
>
>> The case where the sensing window B 6-04 is not included in the resource selection window 6-03 corresponds to an interval of $[n+T_1', n+T_1-1]$ in graph (c) in FIG. 6B. Such a condition may be determined by configuration of $T_1$ and $T_2$ and $T_1'$ and $T_2'$.

When both the sensing window A 6-02 and the sensing window B 6-04 are configured, the final resource selection may be determined by the resource selection window 6-03 and the sensing window B 6-04. The proposed transmission resource selection method-3 or transmission resource selection method-4 is a method for optimizing transmission resource selection by configuring both the sensing window A 6-02 and the sensing window B 6-04 and performing sensing in a situation where both periodic and aperiodic traffic coexist.

The operation of sensing and transmission resource selection in the UE autonomous resource allocation (mode 2) of the sidelink described above may be implemented in various ways. For example, when both sensing window A 6-02 and sensing window B 6-04 are configured, if triggering for transmission resource selection occurs in slot n while a UE always performs sensing for the sensing window A 6-02, the UE may be implemented to perform sensing for the sensing window B 6-04 and select a final transmission resource. However, since the operation in which the UE always performs sensing for the sensing window A 6-02 can use a result of sensing of the sensing window A 6-02 at any time, there is an advantage in terms of latency in selecting a transmission resource, but may be a disadvantage in terms of UE energy consumption. Therefore, according to another method, the UE may be implemented to immediately perform sensing for the sensing window A 6-02 when traffic to be transmitted occurs, and perform sensing for the sensing window B 6-04 after triggering for transmission resource selection occurs in slot n, so as to select the final transmission resource. The latter method may have an advantage of minimizing the energy consumption of a UE by performing sensing only when necessary, but has a disadvantage in terms of latency in selecting a transmission resource.

A detailed embodiment is provided below to further specify the sensing and transmission resource selection method.

First Embodiment

The first embodiment describes a method for determining the number of allocatable resource candidates, based on resource pool information. A UE may first determine one resource candidate $R_{x, y}$ for transmission to a PSSCH from configured resource pool information, wherein y may represent a resource location in a time domain and may be defined as $y=t_y$, $t_y$ represents a logical slot index in the time domain allocated to a resource pool of the UE, and y indicates a physical slot index in the time domain corresponding thereto. In addition, x represents a resource location in a frequency domain, and a resource granularity for resource allocation in the frequency domain may be defined to include A ($\geq 1$) number of sub-channels or all sub-channels. A sub-channel may be defined as a granularity in the frequency domain configured by a plurality of RBs. Specifically, the sub-channel may be defined as an integer multiple of an RB. Resource pool information in the time and frequency domains is configured in resource pool configuration information. For example, the resource pool information in the time domain may be configured through a bitmap, and the resource pool information in the frequency domain may also be configured through a bitmap, or may be configured through information on a resource pool start position in the frequency domain, the size of a sub-channel, and the total number of sub-channels. $R_{x, y}$ according to the definition of the resource granularity in the frequency domain is described in greater detail below with reference to FIG. 7.

Figure 7:
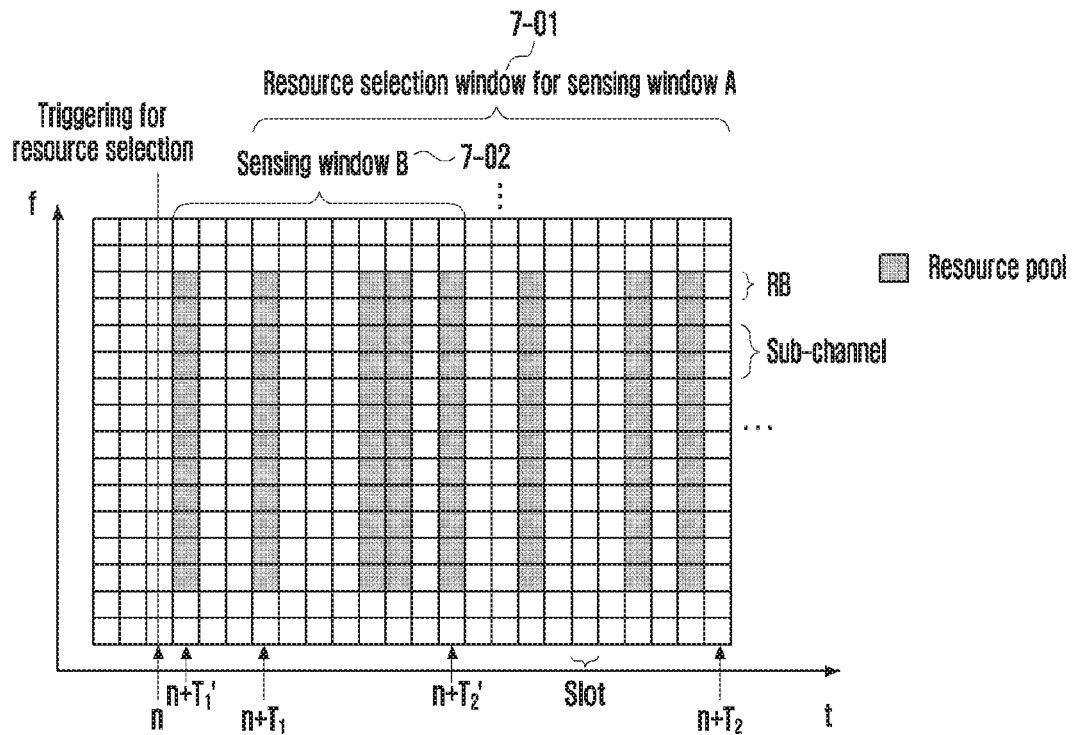
FIG. 7 is a diagram illustrating a method for determining the number of allocatable resource candidates, according to an embodiment.
Figure 7:
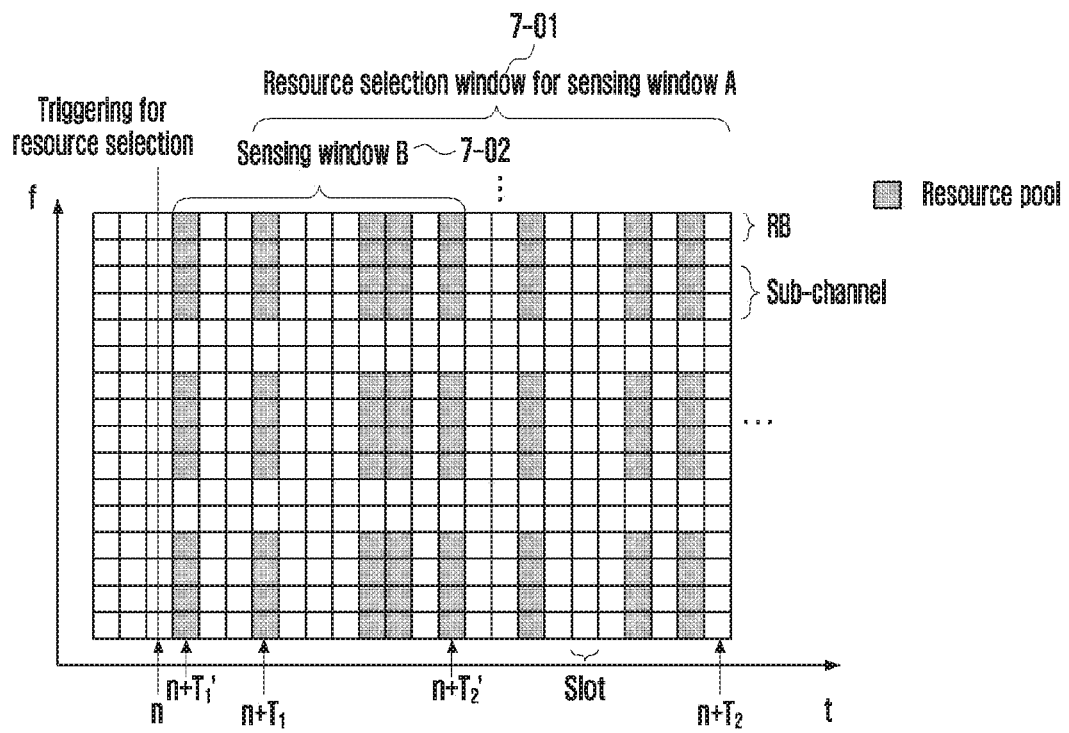

FIG. 7 is a diagram illustrating a method for determining the number of allocatable resource candidates, according to an embodiment. In case (a) of FIG. 7, a resource pool in a frequency domain is always configured by contiguous PRBs, and in case (b) of FIG. 7, a resource pool in a frequency domain is configured by non-contiguous PRBs. In the existing LTE sidelink, as noted from case (a) of FIG. 7, a resource pool in a frequency domain is always configured by contiguous PRBs. A transmission channel of a sidelink is designed based on an uplink channel, and there is a limitation in that a single carrier based orthogonal frequency division multiplex (SC-OFDM) in the frequency domain is used and a resource is allocated in contiguous PRBs in order to enhance a coverage. In the case of SC-OFDM, when resources are continuously allocated, a peak to average power ratio (PAPR) is kept low and thus a coverage can be enhanced. However, since cyclic prefix based orthogonal frequency division multiplex (CP-OFDM) is basically supported in an NR system-based sidelink, even when resources are continuously allocated in the frequency domain, the PAPR cannot be kept low. Therefore, when considering CP-OFDM in the NR system-based sidelink, a discontinuous resource pool in the frequency domain is allowed for more flexible resource allocation. Also, it is required to allow discontinuous allocation of resources in the frequency domain.

As described above with reference to FIG. 7, a resource pool may be restricted to be configured by only contiguous PRBs in the frequency domain (for example, case (a) of FIG. 7), or may be allowed to be configured by non-contiguous PRBs in the frequency domain (for example, case (b) of FIG. 7). The following method in which a resource granularity for resource allocation in the frequency domain is defined will be described.

Method-1: A resource granularity for resource allocation in the frequency domain is defined to include all sub-channels.

The number of allocatable resource candidates $N_{total}$ in a corresponding slot is 1 ($N_{total}=1$).

When the number of all sub-channels is configured to be L, $R_{x, y}$ may be defined as a set of sub-channels of x+j in slot $t_y$, wherein j is 0, 1, . . . , L (j=0, 1, L).

The number of allocatable resource candidates $M_{total}$ in a resource selection window 7-01 may be determined as the number of $t_y$ included in the window.

For example, $M_{total}$ of the resource selection window 7-01 is 7 ($M_{total}=7$) in cases (a) and (b) of FIG. 7.

The number of allocatable resource candidates in sensing window B 7-02 is determined based on a corresponding slot in which sensing is performed, and $N_{total}$ is ($N_{total}=1$).

Method-2: A resource granularity for resource allocation in the frequency domain is defined to include A ($\geq 1$) number of sub-channels but not all sub-channels.

The configurable size of A may be included in resource pool information.

A number of sub-channels may be limited to be continuous.

The number of allocatable resource candidates $N_{total}$ in a corresponding slot may be larger than 1 ($N_{total}>1$).

For example, in cases (a) and (b) of FIG. 7, when a sub-channel is configured by two RBs and A (=2) number of sub-channels are determined as a resource allocation granularity in the frequency domain, $N_{total}$ is 6 ($N_{total}=6$).

When A number of sub-channels are configured as a resource granularity for resource allocation, $R_{x, y}$ may be defined as a set of sub-channels of $x=t_{x+j}$ in slot $y=t_y$, wherein j is 0, 1, . . . , A, $t_x$ represents a logical RB index in the frequency domain allocated to a resource pool of a UE, and x indicates a physical RB index in the frequency domain corresponding thereto.

$t_x$ which is resource pool information in the frequency domain may be configured through a bitmap.

The number of allocatable resource candidates $M_{total}$ in the resource selection window 7-01 may be determined by the number of $t_y$ included in the window and the number of allocatable resource candidates $N_{total}$ in each corresponding slot.

For example, in cases (a) and (b) of FIG. 7, when a sub-channel is configured by two RBs and two sub-channels are determined as a resource allocation granularity in the frequency domain, $N_{total}$ is 6 ($N_{total}=6$), and when $N_{total}$ is the same in all slots, $M_{total}$ of the resource selection window 7-01 is 42 ($M_{total}=42$).

The number of allocatable resource candidates in the sensing window B 7-02 is determined based on a corresponding slot in which sensing is performed. For example, in cases (a) and (b) of FIG. 7, when a sub-channel is configured by two RBs and two sub-channels are determined as a resource allocation granularity in the frequency domain, $N_{total}$ is 6 ($N_{total}=6$).

Second Embodiment

The second embodiment describes a detailed operation of a method for leaving X ($\leq M_{total}$) number of allocatable resource candidates, exclusive of a resource determined to be ineffective for use due to occupation of another UE in a resource selection window by using a result of sensing in sensing window A. As described above, the sensing window A may be mainly used for determining a resource for UE autonomous resource allocation (mode 2) through sensing for periodic traffic. In the sensing window A, sensing may be performed through sidelink measurement and SCI decoding for another UE. Specifically, a UE may identify periodic resource allocation information of another UE through SCI decoding, and if it is determined that it is not effective to allocate a transmission resource to a resource to be used by the another UE by using a sidelink measurement result such as an SL RSRP or SL RSSI, the UE may exclude a corresponding resource from a resource selection window. The second embodiment focuses on an operation of excluding a resource from the resource selection window by using a result of sensing in the sensing window A. However, an operation in which both the sensing window A and sensing window B are configured to perform sensing is also considered. Additional details on a sensing and resource selection method in the sensing window B are provided below with reference to third third embodiment below.

Figure 8:
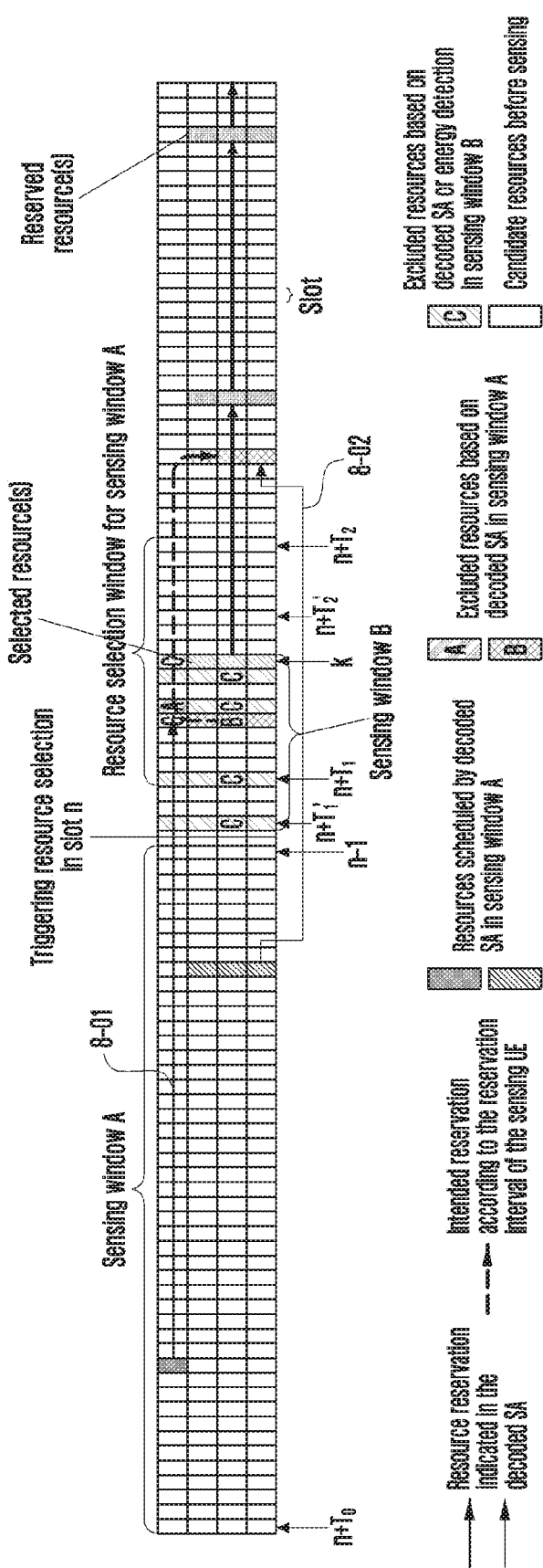
FIG. 8 is a diagram illustrating an operation of excluding a resource from a resource selection window by using a result of sensing in sensing window A, according to an embodiment.

FIG. 8 illustrates an operation of excluding a resource from a resource selection window by using a result of sensing in sensing window A. For the case where both sensing window A and sensing window B are configured, an operation in which both the sensing window A and the sensing window B are configured to perform sensing is also considered in FIG. 8. The operation will be described below.

A UE performs the following sensing operation when the sensing window A is configured.
 1. Monitoring is performed except for in a slot where an actual transmission occurs in a slot interval of $[n-T_0, n-1]$ of the sensing window A.
 2. A threshold value $Th_{a,b}$ for reflecting a sensing result is configured according to a defined priority level.
 3. In a slot interval of $[n+T_1, n+T_2]$ of the resource selection window, the total sum of one resource candidate $R_{x,y}$ (see the first embodiment) is configured to be set SA. In addition, SB is initialized to an empty set.
 4. When all of the following conditions are satisfied, a UE excludes the corresponding $R_{x,y}$ from SA.
    A. In step-1, there is slot $t_z$ which has not been monitored due to occurrence of actual transmission.
    B. There is a reserved resource for slot $t_z$ in the resource selection window by a resource reservation interval configured for slot $t_z$ where the actual transmission has occurred.
 5. When all of the following conditions are satisfied, the UE excludes the corresponding $R_{x,y}$ from SA.
    A. First, the UE may obtain resource allocation information for another UE and QoS information for a packet from SCI received at $t_m$ in the sensing window A. In this case, the resource allocation information may include a reservation interval for a resource. In addition, the QoS information may include priority information according to latency, reliability, a minimum required communication range for transmitted traffic, and data rate requirements. In addition, the UE may obtain location information for another UE from the received SCI. The UE may calculate a TX-RX distance from location information of another UE and its location information.
    B. A sidelink reference signal received power (SL RSRP) for a PSSCH DMRS is measured from the received SCI and the corresponding value is larger than a configured value of $Th_{priTX, PriRX}$.
       i. In this case, PriTX corresponds to priority information for a corresponding UE and PriRX corresponds to priority information for another UE identified from the received SCI.
       ii. In addition to the SL RSRP, TX-RX distance information can be used. Whether to use an SL RSRP or TX-RX distance can be enabled or disabled. If only the SL RSRP is enabled to be used, the above condition is followed. However, in other cases, a condition in which condition B is satisfied can be replaced with the following condition. If only the TX-RX distance is enabled to be used (the SL RSRP is disabled), the condition can be replaced with a condition in which condition B is satisfied when the TX-RX distance calculated from the received SCI is less than or equal to a configured threshold. If both the SL RSRP and the TX-RX distance are enabled to be used, the condition can be replaced with a condition in which condition B is satisfied when the TX-RX distance calculated from the received SCI is less than or equal to the configured threshold and the SL RSRP for a PSSCH DMRS calculated from the received SCI is greater than a threshold of $Th_{priTX, PriRX}$. Note that at least one of the SL RSRP or TX-RX distance is required to be enabled.
    C. There is a reserved resource 8-01 for $t_m$ in a resource selection window by a configured resource reservation interval, or a resource 8-02 which is not in the resource selection window but is expected to overlap with $R_{x,y}$ later.
       i. In FIG. 8, a resource excluded by the resource 8-01 is indicated by A, and a resource excluded by the resource 8-02 is indicated by B.
 6. If a single-subframe resource candidate remaining in SA is smaller than X, a value of $Th_{a,b}$ is increased by 3 dB and step 3 is repeated. In this case, a configuration wherein $X=P*M_{total}$ and $0 \leq P \leq 1$ may be established. For example, a configuration wherein P=0.2 may be established.

7. The UE measures a sidelink received signal strength indicator (SL RSSI) from a result of monitoring of the sensing window A in step 1, and calculates energy metric for $R_{x, y}$ in SA.
8. The UE moves resources in SA to SB from $R_{x, y}$ having a lower energy metric first. This process is repeated until the number of resources in the SB becomes $X=P*M_{total}$ or more.

Additionally, the UE performs the following sensing operations when the sensing window B is configured.

1. Monitoring is performed in every slot from a slot interval of $[n+T_1', n+T_2']$ of the sensing window B up to a slot in which actual transmission resource selection occurs.
2. When all of the following conditions are satisfied, the UE may additionally exclude the corresponding $R_{x, y}$ from the SB (option).
    A. First, the UE may obtain resource allocation information for another UE and QoS information for a packet from SCI received at $t_m$ in the sensing window B. In this case, the resource allocation information may include a reservation interval for a resource. In addition, the QoS information may include priority information according to latency, reliability, a minimum required communication range for transmitted traffic, and data rate requirements. In addition, the UE may obtain location information for another UE from the received SCI. The UE may calculate a TX-RX distance from location information of another UE and its location information.
        i. Since the sensing window B is a sensing interval in which triggering for transmission resource selection is configured after slot n, a resource which is not excluded from the sensing window A and the resource selection window can be additionally excluded by the SCI received at $t_m$ in the sensing window B. In particular, by performing additional sensing in the sensing window B with respect to periodic traffic having a short reservation interval, it is possible to expect more enhanced transmission resource selection.
    B. A sidelink reference signal received power (SL RSRP) for a PSSCH DMRS is measured from the received SCI and the corresponding value is larger than a configured value of $Th_{priTX, PriRX}$.
        i. In this case, PriTX corresponds to priority information for a corresponding UE and PriRX corresponds to priority information for another UE identified from the received SCI.
        ii. In addition to the SL RSRP, TX-RX distance information can be used. Whether to use an SL RSRP or TX-RX distance can be enabled or disabled. If only the SL RSRP is enabled to be used, the above condition is followed. However, in other cases, a condition in which condition B is satisfied can be replaced with the following condition. If only the TX-RX distance is enabled to be used (the SL RSRP is disabled), the condition can be replaced with a condition in which condition B is satisfied when the TX-RX distance calculated from the received SCI is less than or equal to a configured threshold. If both the SL RSRP and the TX-RX distance are enabled to be used, the condition can be replaced with a condition in which condition B is satisfied when the TX-RX distance calculated from the received SCI is less than or equal to the configured threshold and the SL RSRP for a PSSCH DMRS from the received SCI is greater than a threshold of $Th_{priTX, PriRX}$. Note that at least one of the SL RSRP or TX-RX distance is required to be enabled.
    C. There is a reserved resource for $t_m$ in the sensing window B by a configured resource reservation interval, or a resource which is not in the sensing window B but is expected to overlap with $R_{x, y}$ later.
3. The UE measures a sidelink received signal strength indicator (SL RSSI) from a result of monitoring of the sensing window B in step 1, and selects a final transmission resource through the measurement.
    A. Related details are given with reference to the transmission resource selection method-2 and the third embodiment.

In FIG. 8, a resource excluded by the sensing window B is indicated by C. C may be generated in the second or third step for the sensing window B.

Third Embodiment

The transmission resource selection method described above performs sensing by using sensing window B and selects a transmission resource through the sensing. In the third embodiment, a detailed operation of the transmission resource selection method is described.

As described above, when triggering for transmission resource selection occurs in slot n, it is possible to determine whether to allocate a transmission resource in each slot through sensing for traffic in each slot regardless of whether the traffic is aperiodic or periodic in the sensing window B after slot n. Such a scheme is advantageous in selecting a transmission resource through sensing regardless of the type of traffic, but, as described in the second embodiment, is disadvantageous in not being optimized for sensing for aperiodic traffic and transmission resource selection, as compared to a method for sensing for aperiodic traffic through sensing window A and selecting a transmission resource by using a resource selection window. Specifically, the method for sensing for aperiodic traffic through the sensing window A and selecting a transmission resource by using the resource selection window of the second embodiment can provide an improved packet reception performance compared to a result of performing sensing for periodic traffic and selecting a transmission resource by using only the sensing window B. However, since, in the NR sidelink system, an environment in which periodic and aperiodic traffic coexist is considered, it is necessary to sense aperiodic traffic which cannot be predicted in the sensing window A by using the sensing window B.

Figure 9:
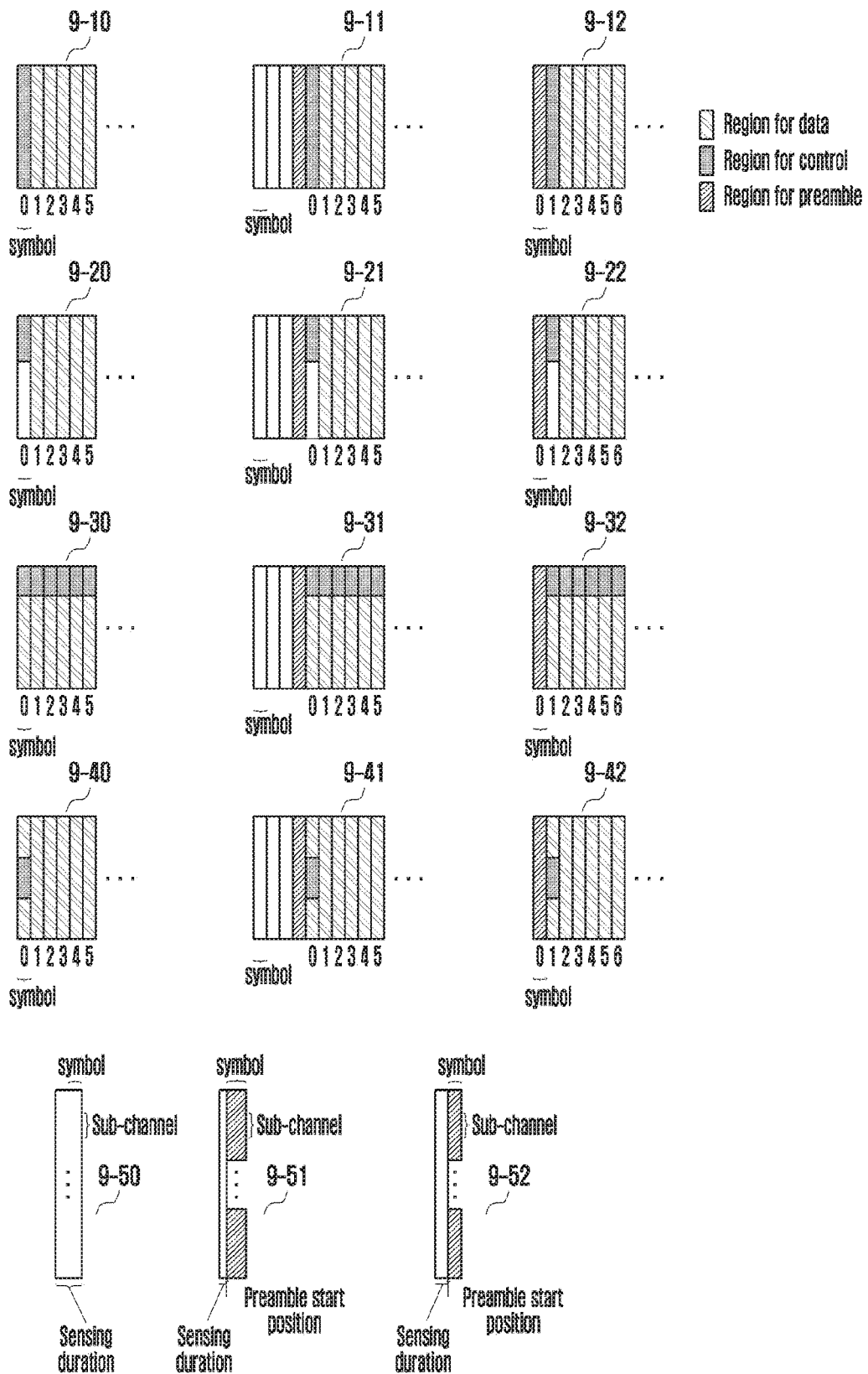
FIG. 9 is a diagram illustrating a detailed sensing method in each slot in sensing window B, according to an embodiment.

The operation of the transmission resource selection method using the sensing window B is described in greater detail below. A drawing related to the sensing window B corresponds to FIGS. 6A and 6B. Further, a detailed sensing method performed in each slot in the sensing window B is discussed with reference to FIG. 9. In FIG. 9, various methods in which a data channel and a control channel are multiplexed are illustrated through reference numerals 9-10, 9-20, 9-30, and 9-40 of FIG. 9. In the LTE sidelink system, only a method in which a data channel and a control channel are frequency-domain multiplexed (FDM), as shown in reference numeral 9-30, is considered, but in the NR sidelink system, various methods, as shown in reference numerals 9-10, 9-20, 9-30, and 9-40, may be considered. In FIG. 9, each numeral described under reference numerals 9-10, 9-20, 9-30, and 9-40 indicates indexing for a symbol. For example, numeral 0 means a first symbol of a slot.

In FIG. 9, reference numerals 9-11, 9-21, 9-31, and 9-41 illustrate a method in which a preamble is transmitted in the last symbol region of a previous slot of a slot in which transmission occurs, according to a method in which a data channel and a control channel are multiplexed. In FIG. 9, each numeral described under reference numerals 9-11, 9-21, 9-31, and 9-41 indicates indexing for a symbol. Numeral 0 means a first symbol of a slot. In reference numerals 9-11, 9-21, 9-31, and 9-41 of FIG. 9, a UE may transmit a preamble in the last symbol region of a previous slot of a slot in which transmission occurs, and thus, notify that transmission occurs in the next slot. Specifically, when transmitting a preamble in slot n, the UE transmits the preamble in the last symbol of slot n−1. A region in which a preamble is transmitted may be a symbol region configured as a guard period (GP) or a region configured for an automatic gain control (AGC).

In FIG. 9, reference numerals 9-12, 9-22, 9-32, and 9-42 illustrate a method in which a preamble is transmitted in a symbol region preceding a slot in which transmission occurs, according to a method in which a data channel and a control channel are multiplexed. In FIG. 9, each numeral described under reference numerals 9-12, 9-22, 9-32, and 9-42 indicates indexing for a symbol. Numeral 0 is a first symbol of a slot. In reference numerals 9-12, 9-22, 9-32, and 9-42 of FIG. 9, a UE transmits a preamble in a symbol region preceding a slot in which transmission occurs. A region in which the preamble is transmitted may be a symbol region configured as a GP or a region configured for an AGC.

Therefore, as noted from reference numerals 9-11, 9-21, 9-31, and 9-41 or 9-12, 9-22, 9-32, and 9-42 of FIG. 9, the UE may determine whether another UE transmits a preamble through energy detection for the preamble transmitted by the another UE in a symbol region in which the preamble is transmitted, and may determine whether the current slot in which transmission is to be performed is idle. Specifically, when a result of energy detection is less than a configured threshold for the energy detection, the UE may determine that a corresponding channel is idle, and when the result of the energy detection is greater than the threshold for the energy detection, the UE may determine that the corresponding channel is busy. The energy detection may be performed through an SL RSSI.

A sensing operation in a preamble transmission region is described in more detail with reference to reference numerals 9-50, 9-51, and 9-52 of FIG. 9. In FIG. 9, reference numerals 9-50, 9-51, and 9-52 illustrate a case in which a region in which a preamble is transmitted is configured by two symbols. However, a region in which a preamble is transmitted may be determined by a symbol region configured as an AGC or a symbol region configured as a GP in a slot structure as described above. Reference numeral 9-50 of FIG. 9 illustrates a case in which all of regions in which a preamble is transmitted are configured as a sensing interval.

However, such a configuration causes a problem in which, when one or more UEs transmit a preamble in a corresponding interval, all the sensing UEs determine that a corresponding slot is not idle. Therefore, in order to solve the problem, as shown in 9-51 and 9-52 of FIG. 9, it is possible to configure a different start position in which a preamble is transmitted for each UE. Then, a UE may perform sensing in a time interval previous to a start position in which a preamble is transmitted. More specifically, an offset value for a preamble transmission start position may be indicated to the UE. Candidate values of a corresponding offset value may be configured in advance through an RRC, and the UE can randomly select one of the configured offset candidate values.

In addition, a UE having a high priority may be configured to select a shorter offset value by reflecting a priority for QoS in a sidelink system. For example, when 10 candidate values of an offset value may be configured in order from low to high, it is possible to limit a candidate value for an offset value which can be selected according to the priority. Therefore, when the priority is high, it is possible to limit to randomly select a value among low offset values, and when the priority is low, it is possible to limit to randomly select a value among high offset values. Alternatively, a method for configuring an additional offset value according to a priority and configuring the same to be added to an offset value for a start position of a preamble may be considered. In this case, according to the priority, the additional offset value may also be determined as a preconfigured fixed value, and may be adjusted so as not to exceed a configured preamble transmission interval.

Based on the above description, the transmission resource selection method-2 will be described in more detail below.

Transmission resource selection method-2

Step-1: Sensing is performed in a corresponding slot within the sensing window B 6-04 to determine whether a corresponding resource is idle.

A resource allocation granularity in the frequency domain may be defined to include A (≥1) number of sub-channels or all sub-channels. The number of allocatable resource candidates $N_{total}$ within a corresponding slot is determined according to the resource allocation granularity in the frequency domain. A detailed description thereof is discussed with reference to the first embodiment.

Sensing may be performed through SCI decoding and sidelink measurement.

Additional details related to the SCI decoding are discussed with reference to the second embodiment.

The sidelink measurement may be performed through energy detection, and energy detection may be performed in a preamble located in symbols preceding a corresponding slot, or in a preamble located in the last symbol of a previous slot of the corresponding slot. The detailed operation is discussed with reference to the above description.

Step-2-1: If a corresponding resource is determined to be idle through sensing in step-1, the final transmission resource 6-06 is determined from among the number of allocatable resource candidates $N_{total}$ within the corresponding slot.

In this case, the final resource may be supported to randomly select one or more resources from among the number of resource candidates $N_{total}$. Supporting to select one or more resources may enable resource transmission of more resources in such an environment in which sidelink congestion is low.

Step-2-2: If the corresponding resource is determined to be busy through sensing in step-1, the following operation may be selected.

If the next slot is also configured as the sensing window B 6-04, step-1 is performed by moving on to the next slot.

If the next slot is not configured as the sensing window B 6-04, the following operation may be considered.

The final transmission resource 6-06 is determined by using QoS information or an energy detection result in the current slot. The QoS information may include priority information according to latency, reliability, a minimum required communication range for transmitted traffic, and data rate requirements.

The determination of the final resource may be performed by randomly selecting only one resource from among the number of resource candidates $N_{total}$, or selecting a resource having the lowest energy measured as a result of energy detection from among the number of resource candidates $N_{total}$. Although it has been determined that all the resources are busy, selecting and transmitting a resource may be interpreted as, for example, the case where the priority for latency is high.

The transmission in the current slot may be canceled and a backoff operation may be performed.

The canceling of the transmission in the current slot and the performing of a backoff operation may be interpreted as, for example, the case where the priority for latency is low.

Fourth Embodiment

In the fourth embodiment, information is described that may be included in SCI in relation to sensing and transmission resource selection. The following information may be included in order to grasp resource allocation information for another UE from received SCI.

Figure 10:
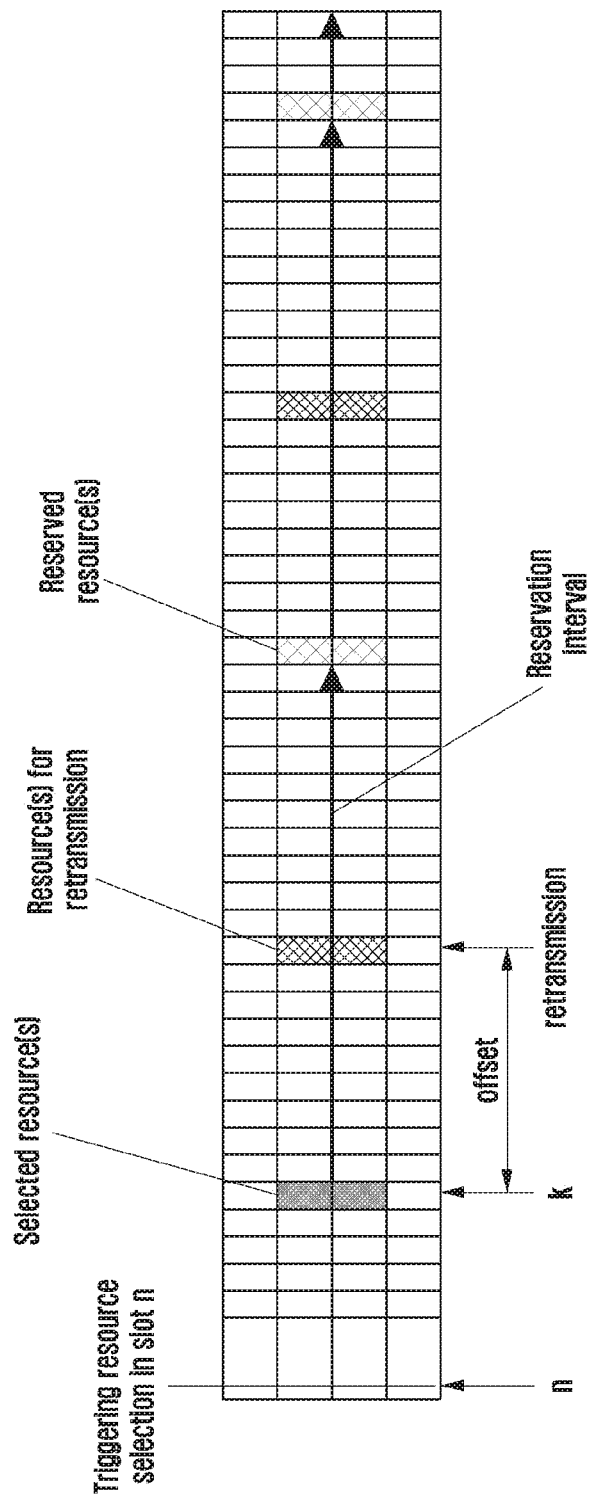
FIG. 10 is a diagram illustrating an operation of selecting a physical sidelink shared channel (PSSCH) resource for transmitting multiple transmission blocks (TBs) through multiple slots, according to an embodiment.

Priority (QoS management information)
Location information
Resource reservation interval
Reservation for retransmission In addition, the priority information may be QoS-related information according to latency, reliability, a minimum required communication range for transmitted traffic, and data rate requirements. Further, a UE may obtain location information for another UE from the received SCI. The UE may calculate a TX-RX distance from location information of another UE and its location information. As shown in FIG. 10, a PSSCH resource for transmitting multiple TBs through multiple slots may be selected in advance. Resource reservation interval information may be included in the SCI in the form shown in Table 1 below.

TABLE 1

| Resource reservation field in SCI format | Indicated value X | Condition |
|---|---|---|
| '0001', '0010', . . . , '1010' | Decimal equivalent of the field | The higher layer decides to keep the resource for the transmission of the next transport block and the value X meets 1 ≤ X ≤ 10 |
| '1011' | 0.5 | The higher layer decides to keep the resource for the transmission of the next transport block and the value X is 0.5 |
| '1100' | 0.2 | The higher layer decides to keep the resource for the transmission of the next transport block and the value X is 0.2 |
| '0000' | 0 | The higher layer decides not to keep the resource for the transmission of the next transport block |
| '1101', '1110', '1111' | reserved | |

In Table 1, a resource reservation interval may be interpreted as 100× ms. For example, a resource reservation interval indicated by "1100" is 20 ms. In addition, a resource reservation interval indicated by "0000" is 0 ms, which implies that a PSSCH resource for transmitting multiple TBs through multiple slots is not reserved in advance, but a PSSCH resource is selected as one TB and transmitted to one slot. Therefore, if another UE performs transmission using information of "0000" through received SCI, it is determined that it is not periodic traffic, and the sensing and resource exclusion operations for the periodic traffic described through the second embodiment may be omitted. In Table 1, a field for supporting a shorter resource reservation interval may be added. Finally, as shown in FIG. 10, an offset value for retransmission is included in SCI as reservation for retransmission information, and the sensing and resource exclusion operations may be performed through the corresponding information as described in the second embodiment.

Fifth Embodiment

The fifth embodiment describes a resource allocation framework in the UE autonomous resource allocation (mode 2) of the sidelink according to transmission resource selection method-1/2/3/4 and the configuration for sensing window A and sensing window B. The following types may be defined according to the configuration for the sensing window A and the sensing window B to describe the details of the resource allocation framework.

type 0: In the case of configuring to use only the sensing window A, a resource selection window for the sensing window A is used together. (see case (a) of FIG. 6A)

type 1: The case of configuring to use only the sensing window B (see case (b) of FIG. 6A)

type 2: In the case of configuring to use both the sensing window A and the sensing B, the resource selection window for the sensing window A is used together. (see case (c) of FIG. 6B)

In addition, resource selection in the UE autonomous resource allocation (mode 2) of the sidelink may be divided into the following two methods.

Dynamic scheme: sidelink PSSCH resources are selected for transmission of one TB in a slot Semi-persistent scheme: sidelink PSSCH resources are selected for transmission of multiple TB(s) over multiple slots In the above definition, the dynamic scheme means that selection of a transmission resource through sensing is determined in one slot with respect to one TB, and the semi-persistent scheme means that selection of a transmission resource through sensing is determined with respect to multiple TBs in multiple slots. Specifically, in the semi-persistent scheme, transmission resource selection may be performed with respect to the multiple slots and multiple TBs through a resource selection counter and a resource reservation interval configuration. A detailed description thereof is provided with reference to FIG. 10. In FIG. 10, a location in a time domain of a resource for multiple TB transmissions may be determined through a resource reservation interval and reserved. A resource may be reserved until a configured resource selection counter becomes 0.

The resource selection in the UE autonomous resource allocation (mode 2) of the sidelink may be performed not only for initial transmission but also for retransmission. According to a retransmission method, a resource for retransmission may be reserved in advance in an initial transmission resource selection process. The case of retransmission through repetition without HARQ feedback may be referred to as blind transmission. In this case, it may be desirable to select and reserve a resource for retransmission in advance in the initial transmission resource selection process. The resource selection for initial transmission and retransmission may be performed through the second and third embodiments. However, in the case of retransmission based on HARQ feedback, it may be inefficient to reserve a retransmission resource in advance. All cases for the above are summarized below.

Case 1: A resource for blind transmission is reserved in the initial transmission resource selection process. In this case, a location of a retransmission resource may be configured through a time offset value for an initial transmission resource location as described through FIG. 10, and may be indicated through SCI as described in the fourth embodiment.

The case 1 can be supported only in a broadcast communication. In addition, the case 1 can be supported not only in a broadcast communication but also in unicast and groupcast communications when HARQ feedback is disabled.

Case 2-1: A retransmission resource based on HARQ feedback is reserved in the initial transmission resource selection process. In this case, a location of the retransmission resource may be configured through a time offset value for an initial transmission resource location as described through FIG. 10, and may be indicated through SCI as described in the fourth embodiment.

The case 2-1 can be supported only in unicast and groupcast communications.

Case 2-2: A retransmission resource based on HARQ feedback is not reserved in the initial transmission resource selection process. When NACK is transmitted based on a result of the HARQ feedback, sensing and transmission resource selection for retransmission resource selection newly occur.

The case 2-2 can be supported only in unicast and groupcast communications.

As described above, the resource allocation framework shown below in Table 2 may be supported according to a configuration of a sensing method, a transmission resource selection method, whether it is initial transmission or retransmission, whether the resource selection method is a semi-persistent scheme or a dynamic scheme, and reservation for a retransmission resource. The resource allocation framework of Table 2 refers to a detailed method of triggering/activation and whether resource allocation is supported according to the above configuration method.

TABLE 2

| Sensing method | Transmission resource selection method | Transmission | Semi-persistent scheme | Dynamic scheme |
|---|---|---|---|---|
| Type 0 | Transmission resource selection method-1 | Initial transmission | Triggered by higher layer signaling | Triggered by higher layer signaling |
| | | Retransmission | Case 1: Triggered by higher layer signaling, activated by SCI | Case 1: Triggered by higher layer signaling, activated by SCI |
| | | | Case 2-1: Triggered by higher layer signaling, activated by SCI | Case 2-1: Triggered by higher layer signaling, activated by SCI |
| | | | Case 2-2: Not supported | Case 2-2: Triggered by higher layer signaling, activated by HARQ feedback (for NACK) |
| Type 1 | Transmission resource selection method-2 | Initial transmission | Not supported | Triggered by higher layer signaling |
| | | Retransmission | Not supported | Case 1: Triggered by higher layer signaling, activated by SCI |
| | | | | Case 2-1: Triggered by higher layer signaling, activated by SCI |
| | | | | Case 2-2: Triggered by higher layer signaling, activated by HARQ feedback (for NACK) |
| Type 2 | Transmission resource selection method-3/4 | Initial transmission | Triggered by higher layer signaling | Triggered by higher layer signaling |
| | | Retransmission | Case 1: Triggered by higher layer signaling, activated by SCI | Case 1: Triggered by higher layer signaling, activated by SCI |
| | | | Case 2-1: triggered by higher layer signaling, activated by SCI | Case 2-1: triggered by higher layer signaling, activated by SCI |
| | | | Case 2-2: Not supported | Case 2-2: Triggered by higher layer signaling, activated by HARQ feedback (for NACK) |

Sixth Embodiment

The sixth embodiment provides a method for solving a fairness problem when various sensing methods are supported, as described in the fifth embodiment. As described in the fifth embodiment, when all of sensing methods, such as type 0, 1, and 2, are supported, the accuracy of sensing may be all changed. Specifically, compared to type 0 and 1, type 2 uses both sensing window A and sensing window B, and thus, provides a more accurate sensing result and has a more advantageous aspect in transmission resource selection. Therefore, the following methods may be considered to solve the above-described problem.

Method 1: In the case of a UE configured to perform sensing as type 2, duration $[n+T_1', n+T_2']$ for sensing window B may be adjusted (for example, case (b) of FIG. 6A or case (c) of FIG. 6B). For example, a preconfigured offset value may be applied to a duration configuration for the sensing window B so as to be disadvantageous to type 2.

Method 2: When resource exclusion is performed in a resource selection window by using a result of sensing of sensing window A, a preconfigured offset value may be added to $Th_{a,b}$ for a UE configured as type 0. The cases of type 0 and type 2 are to solve a fairness problem by using the sensing window A and applying an offset value so as to be advantageous to type 0. In a similar manner, when transmission resource selection occurs by using a result of sensing of sensing window B, a preconfigured offset value may be added to an energy detection threshold for a UE configured as type 1. The cases of type 1 and type 2 are to solve a fairness problem by using the sensing window B and applying an offset value so as to be advantageous to type 1.

Method 3: As described in the third embodiment, when a UE is configured to perform sensing as type 2 in an operation of configuring a preamble start position, an additional offset value may be added to an offset value for the preamble start position for fairness with type 1. In this case, the additional offset value may be a preconfigured value. An offset value which is additionally added may be adjusted so as not to exceed an interval configured as a preamble. Alternatively, at the time of configuring the offset value for the preamble start position without using the offset value which is additionally added, a larger offset may be selected for type 2.

Seventh Embodiment

Figure 11:
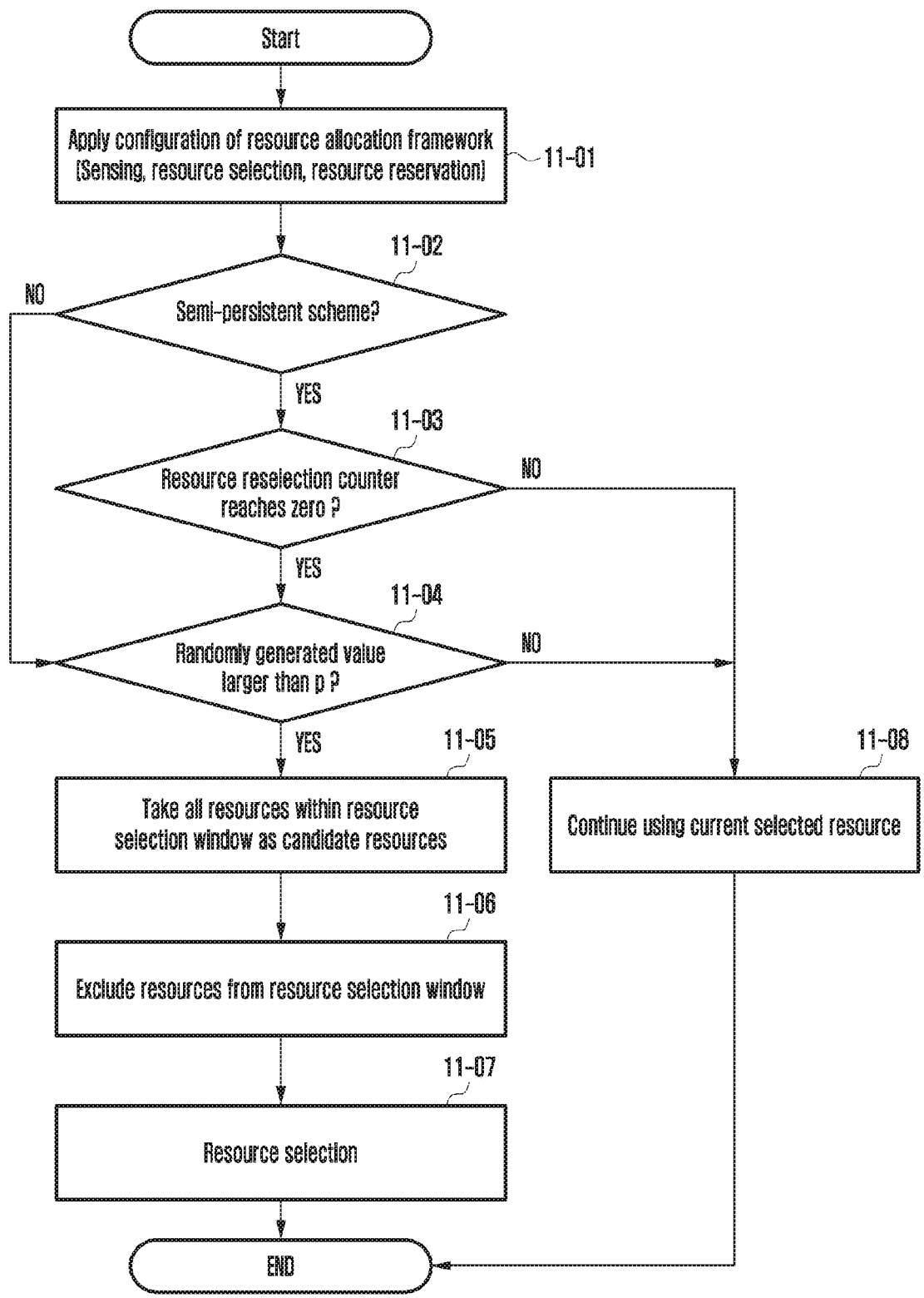
FIG. 11 is a diagram illustrating an operation of a UE autonomous resource allocation (mode 2) method in a sidelink, according to an embodiment.

In the seventh embodiment, FIG. 11 illustrates a flowchart of the above-described UE autonomous resource allocation (mode 2) method in the sidelink, according to an embodiment. A UE applies configuration information for performing a sensing and transmission resource selection process, in operation 11-01. The configuration information may be window configuration information relating to sensing window A and sensing window B for performing sensing. In addition, the configuration information may be configuration information relating to a resource selection window. Further, the configuration information may be resource reservation information according to traffic.

In operation 11-02, the UE determines whether the corresponding transmission uses a semi-static scheme in which a PSSCH resource for transmitting multiple TBs through multiple slots is reserved in advance, or a dynamic scheme in which a PSSCH resource is selected as one TB and transmitted to one slot. In the case of the dynamic scheme, operation 11-04 is performed. In the case of the semi-static scheme, in operation 11-03, the UE determines whether a value of a resource selection counter is 0. If the value of the resource selection counter is not 0, the UE performs transmission by using a currently reserved resource element, in operation 11-08.

If the value of the resource selection counter is 0, the UE moves to operation 11-04. In operation 11-04, a probability value for delaying transmission resource reselection may be configured to the UE. For example, the probability value can be configured as follows: probResourceKeep={0, 0.2, 0.4, 0.6, 0.8}. The UE may move to the next process of transmission resource reselection only when a probability value generated by generating a random variable is larger than probResourceKeep. If the probability value generated by generating the random variable is smaller than probResourceKeep, the UE may move to operation 11-08 and perform transmission by using the currently reserved resource element. The probability value may be configured according to a state of the sidelink. When probResourceKeep is configured to be 0, the state of the sidelink is identified as a very high congestion state, so that the process of transmission resource reselection can be performed unconditionally. When the state of the sidelink is a very low congestion state, probResourceKeep may be configured to be 0.8 to prevent unnecessary transmission resource reselection from being performed. Therefore, when the probability value generated by generating the random variable in operation 11-04 is larger than probResourceKeep, the UE moves to operation 11-05. In operation 11-05, the UE identifies a candidate for a resource which can be selected as a transmission resource. A detailed description thereof is discussed with reference to the first embodiment.

In operation 11-06, an operation of excluding a resource determined to be unsuitable as a transmission resource among the resources identified in operation 11-05 using the sensing result is performed. The details related thereto are described with reference to the second embodiment. Finally, the UE performs transmission resource selection, in 11-07. The details related thereto are discussed with reference to the second and third embodiments.

Eighth Embodiment

The eighth embodiment describes another method for performing sensing in sensing window B. According to the description of FIGS. 6A and 6B, sensing window A and sensing window B may be divided with reference to a time point when triggering for transmission resource selection descends. In addition, when k indicates a slot in which a resource is lastly selected, the sensing window B is stopped in slot k, and the sensing window B in this case is $[n+T_1', k]$. N indicates a time point when triggering for transmission resource selection descends, $T_1'$ indicates a slot in which the sensing window B starts, and various configuration methods for $T_1'$ are discussed with reference to the above embodiment.

It has been described above that sensing in the sensing window B may be performed through SCI decoding and sidelink measurement. In addition, the detailed operation of the sensing in the sensing window B is described through the third embodiment. According to the method of the third embodiment, it is possible to determine whether to allocate a transmission resource in each slot through sensing of traffic in each slot regardless of whether the traffic is aperiodic or periodic in the sensing window B. The sensing may be performed through sidelink measurement, that is, energy detection, and the energy detection may be performed in a preamble located in symbols preceding a corresponding slot, or in a preamble located in the last symbol of a previous slot of the corresponding slot. A region in which a preamble is transmitted may be a symbol region configured as a GP or a region configured for an AGC. An operation of performing the sidelink measurement through the energy detection may be understood as an operation of determining whether a corresponding resource is busy or idle through sensing. In this case, "busy" may be interpreted as a case where it is determined that the corresponding resource is occupied by another UE, and "idle" may be interpreted as a case where it is determined that the corresponding resource is not occupied by another UE. In the eighth embodiment, methods different from those described in the third embodiment are provided.

First, a method is provided for performing sensing in sensing window B, and may be performed through energy detection among sidelink measurement methods. An operation of performing the energy detection may be understood as an operation of determining whether a corresponding resource is busy or idle through sensing. Available sidelink measurement methods are provided below with reference to the tenth embodiment.

Unlike the third embodiment, an interval of energy detection may be configured in an OFDM symbol [0 X] in slot i in the sensing window B. X may be determined within a range of the number of OFDM symbols in which a PSSCH can be transmitted in the sidelink, and X may be configured as 14 (X=14) when the PSSCH can be transmitted in 14 OFDM symbols. If the PSSCH can be transmitted in 10 OFDM symbols by a sidelink channel structure, X may be configured as 10 (X=10). Alternatively, X may be fixedly configured as a specific value. Specifically, a value of X may be determined within a range of OFDM symbols in which the PSSCH can be transmitted. A case where "0" is configured as an interval of energy detection means that energy detection is not performed. In this case, it may be determined that sensing is not performed. A case where X is 14 (X=14) and one of 1 to 14 symbols is selected as an interval of energy detection means that energy detection is performed for a selected symbol length. For example, a case where "2" is configured as an interval of energy detection means that energy detection is performed for the first 2 OFDM symbols in which the PSSCH is transmitted. In general, a case where a specific value Y in [0 X] is configured as an interval of energy detection means that energy detection is performed for the first Y OFDM symbols in which the PSSCH is transmitted. A value for the interval of energy detection configured in the OFDM symbol [0 X] may be configured based on a priority. If the priority is high, an interval of energy detection having a shorter length may be configured. In this case, since a channel is occupied more quickly, and thus, transmission is possible, it may be advantageous for latency.

Two methods in which a PSSCH is transmitted by the above method may be considered. First, a method is provided in which a UE performs sensing during Y OFDM symbols which are an interval of energy detection configured in slot i, and immediately transmits a PSSCH in a corresponding slot when it is determined that a corresponding resource is idle. It may not be possible when Y which is the interval of energy detection is largely configured, and it may not be possible when a start point of PSSCH transmission in the sidelink is not freely configured in a slot. A second method is provided in which a UE performs sensing during Y OFDM symbols which are an interval of energy detection configured in slot i, and transmits a PSSCH in slot (i+1) when it is determined that a corresponding resource is idle. In this case, slot (i+1) may refer to the next consecutive slot of slot i, or may refer to the next transmittable slot, not the next consecutive slot of slot i. The remaining symbols after sensing is performed in slot i may be defined as an interval in which a reservation signal for the next slot transmission is transmitted. Specifically, transmission of a PSSCH in slot (i+1) is reserved.

Another method for performing sensing in sensing window B includes using SCI decoding and sidelink measurement. Sensing window A and sensing window B may be divided with reference to a time point when triggering for transmission resource selection descends. The method may be interpreted as continuing the sensing up to slot k in which a resource is finally selected similarly to the sensing window A even after triggering for transmission resource selection descends from slot n. Therefore, when the sensing window B starts from slot n, it may be meaningless to divide the sensing window A and the sensing window B. Thus, it is possible to designate a sensing window without distinguishing between the sensing window A and the sensing window B.

The second embodiment describes a method for determining allocatable resource candidates by excluding a resource determined to be ineffective for use due to occupation of another UE in a resource selection window by using a result of sensing in sensing window A. Therefore, a list of allocatable resource candidates may be determined using a result of sensing of the sensing window A at a time point when triggering for transmission resource selection is performed in slot n. When triggering for transmission resource selection occurs in slot n and the sensing window B is configured to additionally perform sensing until a final resource is selected, a result of sensing of the sensing window B may be additionally reflected in resource selection.

More specifically, when slot i corresponds to the sensing window B, sidelink measurement may be performed, and determination of whether the corresponding slot is idle or busy may be performed. The determination may be performed through PSSCH RSSI (energy detection) for the corresponding slot i. For example, when the PSSCH RSSI is smaller than a configured threshold, it may be determined that the slot is idle. When slot i is determined to be idle, a transmitting UE assumes that slot (i+1) is also idle, and when slot (i+1) is a slot available for resource transmission according to a result of sensing of the sensing window A, a resource may be finally selected in slot (i+1). In this case, slot (i+1) may refer to the next consecutive slot of slot i, or may refer to the next transmittable slot, not the next consecutive slot of slot i.

The PSSCH RSSI (energy detection) may be performed only in a previous slot of a slot available for resource transmission, according to a result of sensing of the sensing window A. Alternatively, the PSSCH RSSI (energy detection) may not be performed. In addition, in the corresponding slot i, the transmitting UE determines whether another UE occupies the corresponding resource after successfully decoding SCI (SCI decoding), and if it is determined that there is a resource to be additionally excluded, the transmitting UE may additionally exclude the resource from a list of allocatable candidate resources determined through the sensing window A. A process of making a list of allocatable candidate resources by using a result of sensing in the sensing window A is described in the previous embodiment.

In this case, whether exclusion is performed may be determined using a PSCCH RSRP or PSSCH RSRP measured in the corresponding slot i. The definition of the PSCCH RSRP or PSSCH RSRP is discussed with reference to the tenth embodiment. When it is determined that all slots are busy as a result of sensing in the sensing window B, a backoff operation may be performed. However, if transmission should be performed due to a priority, a final transmission resource may be selected within a configured resource selection window. Various methods for selecting the final resource are discussed with reference to the above embodiment.

Ninth Embodiment

The ninth embodiment describes a method for selecting a resource pool to be transmitted among multiple resource pools when the multiple resource pools are allocated to a transmitting UE. In relation to the UE autonomous resource allocation (mode 2) method, a method in which a resource pool is allocated to a transmitting UE and a resource is selected from the resource pool has been disclosed. If multiple resource pools are allocated to the transmitting UE, a resource pool to which the UE autonomous resource allocation (mode 2) method is applied is required to be selected from the multiple resource pools. In a simplest method for supporting the above, one resource pool may be randomly selected from multiple resource pools configured for a transmitting UE and a final transmission resource may be selected from the selected resource pool by applying the disclosed UE autonomous resource allocation (mode 2) method. Otherwise, one resource pool may be selected from the multiple resource pools configured for the transmitting UE through a channel bus ratio (CBR). In a V2X sidelink, whether a corresponding channel is congested may be measured through the CBR. The CBR may be defined as follows.

CBR

A CBR measured in slot n is as follows.

With respect to a PSSCH, a sidelink received signal strength indicator (S-RSSI) measured in the slot [n−100, n−1] in a resource pool is defined as a ratio of sub-channels exceeding a (pre-) configured threshold. A slot index is based on a physical slot index.

The S-RSSI refers to a received signal strength, indicates how much power (in [W]) is received from a receiving UE, and is observed by valid OFDM symbol locations in a slot of the sidelink and a configured sub-channel.

It is possible to identify whether a corresponding channel is congested by a CBR value measured according to the definition of the CBR. The definition of the CBR is not limited to the method specified above. The measured CBR value may be mapped in a corresponding CBR level, and it is possible to identify whether the channel is congested by the CBR level. In other words, a case where the measured CBR level is high means a congested environment in which a lot of UEs access the corresponding channel and perform transmission. Therefore, when a plurality of resource pools configured for the transmitting UE are configured, a CBR is measured for each resource pool, and a resource pool may be ordered by the measured CBR value. Thereafter, a resource pool having the lowest CBR value among the plurality of resource pools configured for the transmitting UE may be selected. It is advantageous in that congestion control can be performed by performing UE autonomous resource allocation (mode 2) to a resource pool in which a channel is not congested.

Tenth Embodiment

The tenth embodiment describes a sidelink measurement method, according to a case where a start position of a PSSCH/the number of scheduled symbols or a location/a pattern of a demodulation reference signal (DMRS) may be configured differently for each UE in an operation of performing SCI decoding and sidelink measurement in the UE autonomous resource allocation (mode 2) method of the disclosure. The sidelink measurement is to determine whether another UE occupies time and frequency resources to be used for transmission by a transmitting UE. To this end, the following measurement methods may be considered.

PSCCH reference signal received power (PSCCH RSRP): an average received power for a DMRS included in a PSCCH is measured.

PSSCH reference signal received power (PSSCH RSRP): an average received power for a DMRS included in a PSSCH is measured.

PSSCH received signal strength indicator (PSSCH RSSI): an average received power of an OFDM symbol in which a PSSCH is transmitted is measured.

The transmitting UE may obtain information on another UE from SCI information obtained after successfully decoding the SCI (SCI decoding). In this process, since the SCI is transmitted via the PSCCH, a PSCCH RSRP may be measured during the sidelink measurement. In addition, the UE may identify PSSCH information connected to the SCI information from the SCI information and measure a PSSCH RSRP or PSSCH RSSI during the sidelink measurement. The PSSCH RSSI may be used and interpreted in various ways according to a time interval in which the PSSCH RSSI is measured. As in the second embodiment, the PSSCH RSSI measured in a sensing window A interval may be used for excluding a resource considered to be ineffective for use due to occupation of another UE in a resource selection window by using a result of sensing in the sensing window A, and ordering and sorting allocatable resource candidates. Alternatively, as in the embodiment, a PSSCH RSSI measured in an energy detection interval may be interpreted as a measurement metric for energy detection, where the energy detection may be interpreted as an operation of determining whether a corresponding resource is busy (occupied by another UE) or idle (not occupied by another UE) through sensing. However, as in the embodiment, a problem in measuring the PSSCH RSRP or PSSCH RSSI may occur if a corresponding location is not known when a start position of a PSSCH/the number of scheduled symbols or a location/a pattern of a DMRS is differently configured for each UE in the sidelink.

First, a location/a pattern of a DMRS may be differently configured for each UE. In the case of the LTE V2X system, one fixed PSSCH DMRS location/pattern is used, but in the case of an NR V2X system, different PSSCH DMRS location/patterns may be supported according to a sidelink environment. The following two methods may be considered to support PSSCH RSRP measurement in a corresponding slot.

Method 1: PSSCH DMRS location/pattern information is included in SCI.

Method 2: When a frequency pattern of a PSSCH DMRS is fixed for each UE and a location of a DMRS in a time domain is fixed, but the number of DMRS symbols can be differently configured, a PSSCH RSRP is measured using only a front-loaded PSSCH DMRS.

In Method 1, PSSCH DMRS location/pattern information may be included in SCI, and a transmitting UE may successfully decode received SCI, and then measure an average received power for a DMRS included in a PSSCH, based on the PSSCH DMRS location/pattern information included in the obtained SCI information. In this case, the PSSCH DMRS pattern information may be frequency pattern information of the PSSCH DMRS, and the PSSCH DMRS location information may be information on a symbol in which the DMRS is located and the number of configured DMRS symbols. The PSSCH DMRS location/pattern information is not limited thereto, and generally refers to time and frequency location information in which the PSSCH DMRS is transmitted. In the case of Method 2, the frequency pattern of the PSSCH DMRS is fixed for each UE and the location of the DMRS in the time domain is fixed, but the number of DMRS symbols can be differently configured. Therefore, the configuration of the number of DMRS symbols in the time domain may be determined by the relative speed between UEs in V2X communication.

Specifically, when the relative speed between UEs is high, the number of DMRS symbols in the time domain may be configured to be high and transmitted, and when the relative speed between UEs is low, the number of DMRS symbols in the time domain may be configured to be low and transmitted. However, in Method 2, the front-loaded PSSCH DMRS is assumed to be a symbol which is always transmitted regardless of the configured number of DMRS symbols, and an average received power for the PSSCH DMRS may be measured using the symbol.

In order to support PSSCH RSSI measurement in a corresponding slot when a start position of a PSSCH/the number of scheduled symbols may be differently configured for each UE, a method for including a start position of a PSSCH and length information (that is, the number of symbols) in which the PSSCH is scheduled in SCI may be considered. In this case, the transmitting UE may successfully decode received SCI, and then measure an average received power of an OFDM symbol in which the PSSCH is transmitted, based on the start position of the PSSCH and the length information in which the PSSCH is scheduled, which are included in the obtained SCI information.

In performing sidelink measurement through the disclosed method, even when a start position of a PSSCH/the number of scheduled symbols or a location/a pattern of a DMRS is differently configured for each UE, sidelink measurement, such as a PSSCH RSRP or PSSCH RSSI, may be performed. If a start position of a PSSCH/the number of scheduled symbols or a location/a pattern of a DMRS is differently configured for each UE only in a case where operation is performed in a shared licensed carrier used by an NR Uu in an NR sidelink, it is also possible to consider only the use of a PSCCH RSRP without considering the method described above. In this case, the number of PSCCH symbols may be different, but a DMRS pattern for a PSCCH is assumed to be constant regardless of the number of symbols to which the PSCCH is allocated.

Eleventh Embodiment

The eleventh embodiment provides a method for solving problems of inefficient resource use and overbooking when a transmitting UE allows a reservation of a resource for retransmission, based on HARQ feedback in NR V2X. In general, there is a difference between a resource reservation for blind retransmission by a transmitting UE and a resource reservation for retransmission based on HARQ feedback. Specifically, the case of blind retransmission means that repetitive transmission is performed to increase the reliability of transmission regardless of a result of HARQ feedback. The blind retransmission may be used even when HARQ ACK/NACK feedback is not enabled. Therefore, the reservation of a resource for blind retransmission is definitely necessary for repetitive transmission.

However, since the reservation of a resource for retransmission based on HARQ feedback is an operation of reserving a resource in spite of a channel condition in which an ACK is transmitted, an overbooking problem of a wireless resource and a problem of inefficient resource use may occur. Therefore, if an ACK is transmitted, an operation of releasing a reserved resource for retransmission may be necessary. However, such a method has a disadvantage in that additional signaling is required to be introduced to release a reserved resource. In addition, a system is required to satisfy a predetermined target block error rate, and in this case, since an ACK transmission rate is generally higher than an NACK, an additional operation is required to be frequently performed to release a resource.

Therefore, a method is necessary for solving problems of inefficient resource usage and overbooking when a transmitting UE allows a reservation of a resource for retransmission, based on HARQ feedback in NR V2X. In order to solve such problems without introducing additional signaling for releasing a reserved resource, a method for selecting a reserved resource for retransmission based on HARQ feedback as a transmission resource in mode 2 sensing and resource selection operations is required to be introduced. The mode 2 sensing may be defined as an operation of performing SCI decoding for another UE and an operation of performing sidelink measurement. In addition, the transmission resource selection may be defined as an operation of determining a resource for sidelink transmission by using a result of the sensing.

The transmitting UE may successfully decode SCI (SCI decoding) and then obtain resource information for another UE from the obtained SCI information, and determine whether a resource for sensing is occupied by another UE. More details are given with reference to the second embodiment. A UE measures a PSCCH RSRP or PSSCH RSRP after SCI decoding, and when a corresponding value is larger than a configured $Th_{priTX, PriRX}$ value, a corresponding resource may be excluded.

If the transmitting UE successfully decodes SCI and then determines that a transmission resource is a reserved resource for retransmission based on HARQ feedback from the obtained SCI information, the transmitting UE may determine whether to exclude the resource by applying a $Th_{priTX, PriRX}$ value different from that of initial transmission. Specifically, in the case of a reserved resource for retransmission based on HARQ feedback, an offset value may be configured and applied to a $Th_{priTX, PriRX}$ value. For example, when an offset value is configured as 3 dB, a value to which $Th_{priTX, PriRX}+3$ dB is applied may be used to determine whether to exclude a resource. In this case, due to an increased threshold, a reserved resource for retransmission based on HARQ feedback may not be excluded from transmission resource candidates.

In order to support such a method, the SCI information may include information on whether it is an initial transmission or a retransmission, and information on whether a retransmission is a HARQ-based retransmission or a blind retransmission together. The SCI information may include only information on whether it is an initial transmission or a retransmission, and information on whether a retransmission is a HARQ-based retransmission or a blind retransmission may be identified by other methods. For example, when enablement or disablement of HARQ ACK/NACK transmission is configured in resource pool information, the transmitting UE may determine whether a retransmission is a HARQ-based retransmission or a blind retransmission from the resource pool information.

Twelfth Embodiment

The twelfth embodiment provides a method in which a sidelink channel state information (SL CSI) report is transmitted via a PSSCH in NR V2X. In the NR V2X, SL CSI may include information such as a CQI and a RI. However, information included in the SL CSI is not limited to the CQI and RI. Previously, a method for performing sensing by a UE and selecting a transmission resource through the sensing for the UE autonomous resource allocation (mode 2) in the V2X sidelink has been described. Next, a method for selecting a resource for an SL CSI report when a receiving UE measures a channel state and reports the channel state to a transmitting UE in mode 2 is described. The SL CSI report may be transmitted via the PSSCH in the NR V2X. In this case, a case where only information of SL CSI is included in the PSSCH without data information is also considered. Specifically, in a case where the PSSCH is used as the resource for the SL CSI report when the receiving UE measures a channel state and reports the channel state to the transmitting UE in mode 2, the following methods may be considered.

Method 1: A receiving UE directly determines a PSSCH resource for transmitting SL CSI through mode 2 sensing and resource selection.
Method 2: A receiving UE transmits SL CSI by using a PSSCH resource determined by a transmitting UE through mode 2 sensing and resource selection.

In Method 1, a receiving UE directly selects and transmits a PSSCH resource by using the mode 2 sensing and resource selection method described above in order to transmit SL CSI. In Method 2, a receiving UE feeds back SL CSI to a PSSCH resource configured by a transmitting UE through mode 2 sensing and resource selection. For Method 2, the transmitting UE is required to reserve one or more resources through mode 2 sensing and resource selection, and when the transmitting UE triggers/activates a CSI report, the transmitting UE may indicate, through SCI, locations in the time and frequency domains of a resource to receive the CSI report among the reserved resources.

In the case of Method 1, the receiving UE may directly select a frequency resource suitable for an SL CSI report through mode 2 sensing and resource selection. In this case, the frequency resource may be defined as the number of PRBs or the number of sub-channels. However, in Method 1, a PSSCH frequency resource determined by the transmitting UE through mode 2 sensing and resource selection may not be a resource selected for an SL CSI report, but may be a frequency resource selected for initial transmission or retransmission of data by the transmitting UE.

If only a CQI and an RI are included in the SL CSI as feedback information, only 4-bit CQI information and 1-bit RI information indicating whether a rank is 1 or 2 may be required in the NR V2X system. In this case, it may not be necessary to allocate a lot of frequency resources to feed back the total 5-bit SL CSI information. Therefore, in the case where Method 2 is used, the following methods may be considered in which the transmitting UE indicates locations in the time and frequency domains of a resource to report CSI to the receiving UE through SCI.

Method 1: Both a location in the time domain and a location in the frequency domain are indicated through SCI
Method 2: Only a location in the time domain is indicated through SCI
Method 3: Only a location in the frequency domain is indicated through SCI All of the above methods are methods in which a transmitting UE triggers/activates a CSI report through SCI and informs of information on time and frequency resources for a receiving UE to report CSI. In Method 1, a location in the frequency domain may be frequency resource information (e.g., the number of PRBs) selected for a CSI report by the transmitting UE through mode 2 sensing and resource selection. If, in Method 1, the location in the frequency domain is not selected for the purpose of a CSI report, but is selected for the purpose of data transmission of the transmitting UE, the CSI report may be promised to be limited to a specific location in an indicated location in the frequency domain. For example, only X number of PRBs from a low or high PRB index may be used for the CSI report in the indicated location in the frequency domain.

Method 2 indicates only a location in the time domain through SCI. In this method, location information of data on a frequency axis, previously received by the receiving UE, may be used to assume a location in the frequency domain for the CSI report. However, even in Method 2, the CSI report may be promised to be limited to a specific location in an assumed location in the frequency domain. For example, only X number of PRBs from a low or high PRB index may be used for the CSI report in the assumed location in the frequency domain.

In Method 3, a location in the frequency domain may be frequency resource information (e.g., the number of PRBs) selected for a CSI report by the transmitting UE through mode 2 sensing and resource selection. If, in Method 3, the location in the frequency domain is not selected for the purpose of a CSI report, but is selected for the purpose of data transmission of the transmitting UE, the CSI report may be promised to be limited to a specific location in an indicated location in the frequency domain. For example, only X number of PRBs from a low or high PRB index may be used for the CSI report in the indicated location in the frequency domain. In the case of Method 3, a location in the time domain for a CSI report may be assumed after reception of SCI and slot X.

Figure 12:
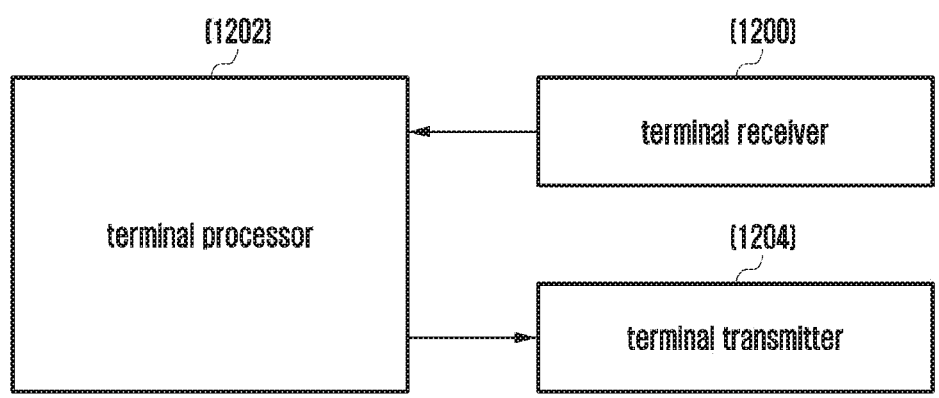
FIG. 12 is a diagram illustrating a structure of a terminal, according to an embodiment.
Figure 13:
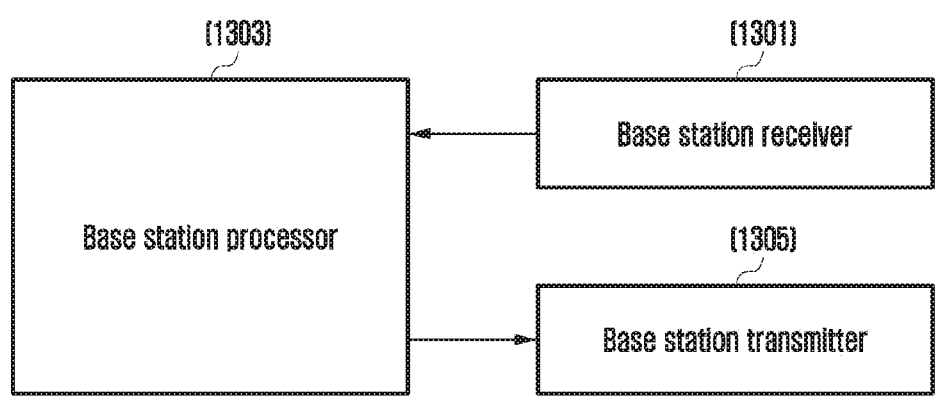
FIG. 13 is diagram illustrating a structure of a base station, according to an embodiment.

To perform the above embodiments, transmitters, receivers, and processors of a UE and a base station are illustrated in FIGS. 12 and 13, respectively. An operation of a UE and a method for resource allocation in a process in which a vehicular UE supporting V2X communication exchanges information with another vehicular UE and a pedestrian portable UE by using a sidelink are described in the above embodiments. In order to perform the method and the operation, the transmitters, the receivers, and the processors of the UE and the base station are required to operate according to embodiments, respectively.

FIG. 12 is a block diagram illustrating an internal structure of a UE (or, terminal), according to an embodiment. As shown in FIG. 12, a terminal of the disclosure includes a terminal receiver 1200, a terminal transmitter 1204, and a terminal processor 1202. The terminal receiver 1200 and the terminal transmitter 1204 may be collectively referred to as a transceiver. The transceiver may transmit or receive a signal to or from a base station. The signal may include control information and data. The transceiver may include an RF transmitter configured to up-convert and amplify a frequency of a transmitted signal, and an RF receiver configured to amplify a received signal with low noise, and down-convert a frequency of the signal. In addition, the transceiver may receive a signal through a wireless channel, output the signal to the terminal processor 1202, and transmit the signal output from the terminal processor 1202 through the wireless channel. The terminal processor 1202 may control a series of processes such that the terminal can operate according to the above-described embodiment.

FIG. 13 is a block diagram illustrating an internal structure of a base station, according to an embodiment. As shown in FIG. 13, a base station of the disclosure includes a base station receiver 1301, a base station transmitter 1305, and a base station processor 1303. The base station receiver 1301 and the base station transmitter 1305 may be collectively referred to as a transceiver in an embodiment. The transceiver may transmit or receive a signal to or from a UE. The signal may include control information and data. To this end, the transceiver may include an RF transmitter configured to up-convert and amplify a frequency of a transmitted signal, and an RF receiver configured to amplify a received signal with low noise, and down-convert a frequency of the signal. In addition, the transceiver may receive a signal through a wireless channel, output the signal to the base station processor 1303, and transmit the signal output from the base station processor 1303 through the wireless channel. The base station processor 1303 may control a series of processes such that the base station can operate according to the above-described embodiment.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope and spirit of the disclosure. In addition, a part or all of specific embodiments may be applied together with a part or all of the other embodiments. Therefore, the scope of the disclosure should not be defined as being limited to the embodiments, but should be defined by the appended claims and equivalents thereof.

What is claimed is:

1. A method performed by a first terminal in a wireless communication system, the method comprising:
receiving, from a second terminal, sidelink control information (SCI) including information on a resource reserved by the second terminal;
identifying a retransmission scheme for the resource based on the SCI;
in case that the identified retransmission scheme is a first retransmission scheme, determining a threshold as a first value;
in case that the identified retransmission scheme is a second retransmission scheme corresponding to a hybrid automatic repeat request (HARQ) retransmission, determining the threshold as a second value greater than the first value; and
determining a sidelink (SL) transmission resource based on a sidelink measurement associated with the resource and the determined threshold.

2. The method of claim 1, wherein:
the second value is obtained by adding an offset value to the first value; and
the first value is for an initial transmission resource of the first terminal.

3. The method of claim 1, wherein the determined threshold is a function determined by priority information of the first terminal and priority information of the second terminal identified from the SCI.

4. The method of claim 3, wherein the priority information is determined based on a quality of service (QoS) of a terminal.

5. The method of claim 1, wherein:
the sidelink measurement corresponds to a reference signal received power (RSRP) measurement result of a physical sidelink control channel (PSCCH) or a physical sidelink shared channel (PSSCH); and
in case that the sidelink measurement is greater than the determined threshold, the resource is excluded from a candidate resource for the SL transmission resource.

6. A first terminal in a wireless communication system, the first terminal comprising:
a transceiver configured to transmit and receive signals; and
a controller configured to:
receive, from a second terminal, sidelink control information (SCI) including information on a resource reserved by the second terminal;
identify a retransmission scheme for the resource based on the SCI;
in case that the identified retransmission scheme is a first retransmission scheme, determine a threshold as a first value;
in case that the identified retransmission scheme is a second retransmission scheme corresponding to a hybrid automatic repeat request (HARQ) retransmission, determine the threshold as a second value greater than the first value; and
determine a sidelink (SL) transmission resource based on a sidelink measurement associated with the resource and the determined threshold.

7. The first terminal of claim 6, wherein:
the second value is obtained by adding an offset value to the first value; and
the first value is for an initial transmission resource of the first terminal.

8. The first terminal of claim 6, wherein the determined threshold is a function determined by priority information of the first terminal and priority information of the second terminal identified from the SCI.

9. The first terminal of claim 8, wherein the priority information is determined based on a quality of service (QoS) of a terminal.

10. The first terminal of claim 6, wherein:
the sidelink measurement corresponds to a reference signal received power (RSRP) measurement result of a physical sidelink control channel (PSCCH) or a physical sidelink shared channel (PSSCH); and
in case that the sidelink measurement is greater than the determined threshold, the resource is excluded from a candidate resource for the SL transmission resource.

* * * * *